United States Patent [19]
Kamei et al.

[11] Patent Number: 5,913,099
[45] Date of Patent: Jun. 15, 1999

[54] COPY APPARATUS WHICH CONTROLS BINDING POSITION THROUGH IMAGE ROTATION AND SHEET REVERSAL

[75] Inventors: Masafumi Kamei; Yoshihiko Suzuki, both of Tokyo; Satoru Kutsuwada, Kawasaki, all of Japan

[73] Assignee: Canon Kabushiki Kaisha, Tokyo, Japan

[21] Appl. No.: 08/790,807

[22] Filed: Jan. 30, 1997

Related U.S. Application Data

[63] Continuation of application No. 08/203,351, Mar. 1, 1994, abandoned.

[30] Foreign Application Priority Data

Mar. 2, 1993 [JP] Japan .................................. 5-041479

[51] Int. Cl.⁶ .................................................. G03G 15/00
[52] U.S. Cl. ............................ 399/296; 399/408; 399/410; 270/12; 270/58.01; 270/58.08
[58] Field of Search ................................ 358/296; 270/12, 270/18, 58.01, 58.09, 58.07, 58.08; 271/3.02; 399/410, 408, 407, 296

[56] References Cited

U.S. PATENT DOCUMENTS

| | | |
|---|---|---|
| 4,763,167 | 8/1988 | Watanabe et al. ................... 355/14 R |
| 4,905,054 | 2/1990 | Rood ........................................ 355/324 |
| 4,930,761 | 6/1990 | Naito et al. ......................... 270/58.16 |
| 4,965,629 | 10/1990 | Hiroi et al. .............................. 355/50 |
| 5,285,249 | 2/1994 | Mahoney ................................ 355/324 |
| 5,343,304 | 8/1994 | Nakai et al. ............................ 358/296 |

Primary Examiner—Benjamin R. Fuller
Assistant Examiner—Craig A. Hallacher
Attorney, Agent, or Firm—Fitzpatrick, Cella, Harper & Scinto

[57] ABSTRACT

An image forming apparatus comprises an image memory unit for storing image information, an image rotation unit for applying predetermined rotation to the image information read from the image memory unit, an image forming unit for forming an image on an output medium based on the image information derived directly from the image memory unit or by the image rotation unit, and a control unit for controlling the rotation of the image by the image rotation unit such that a staple position of the output medium formed by the image forming unit comes to a predetermined position.

32 Claims, 23 Drawing Sheets

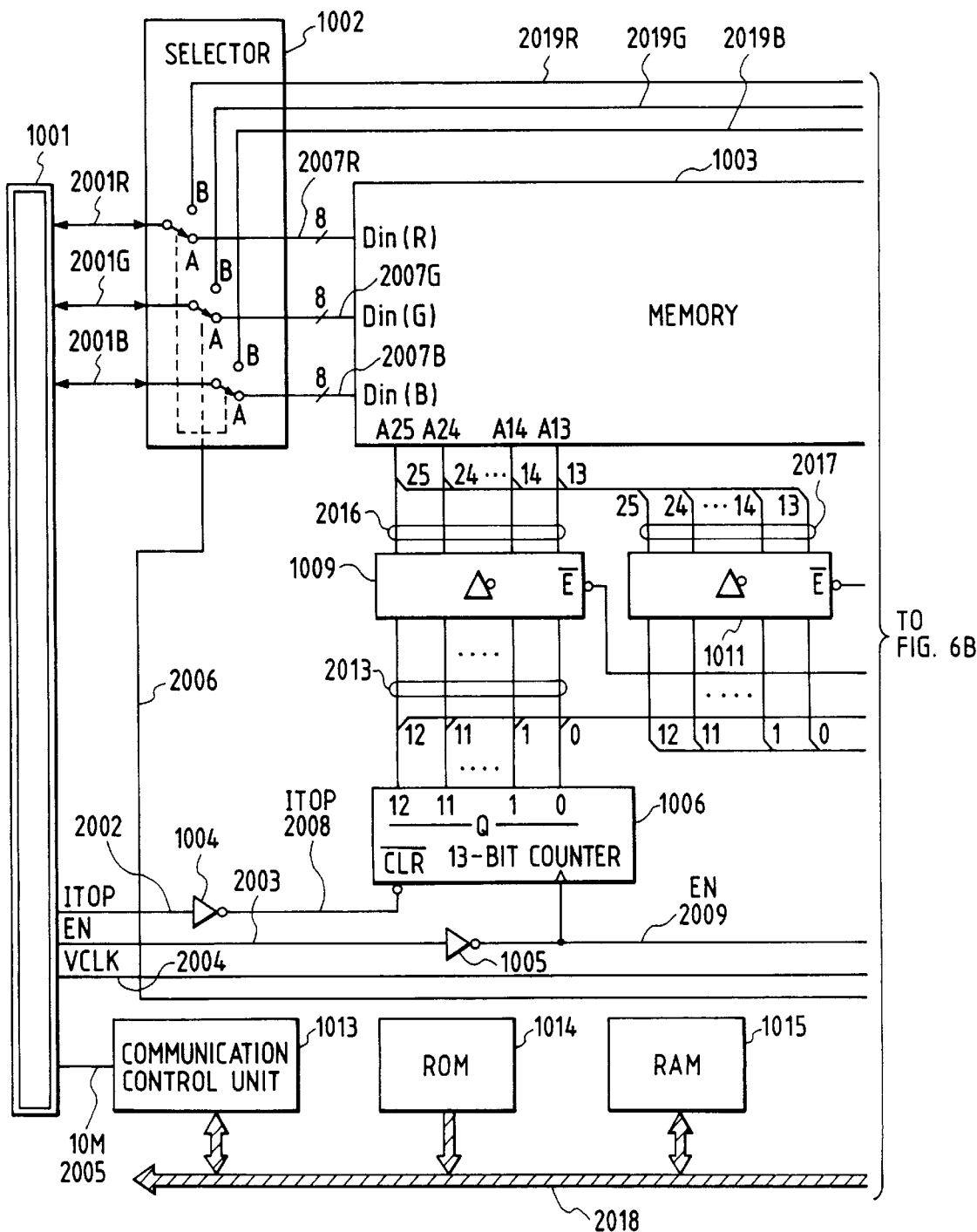

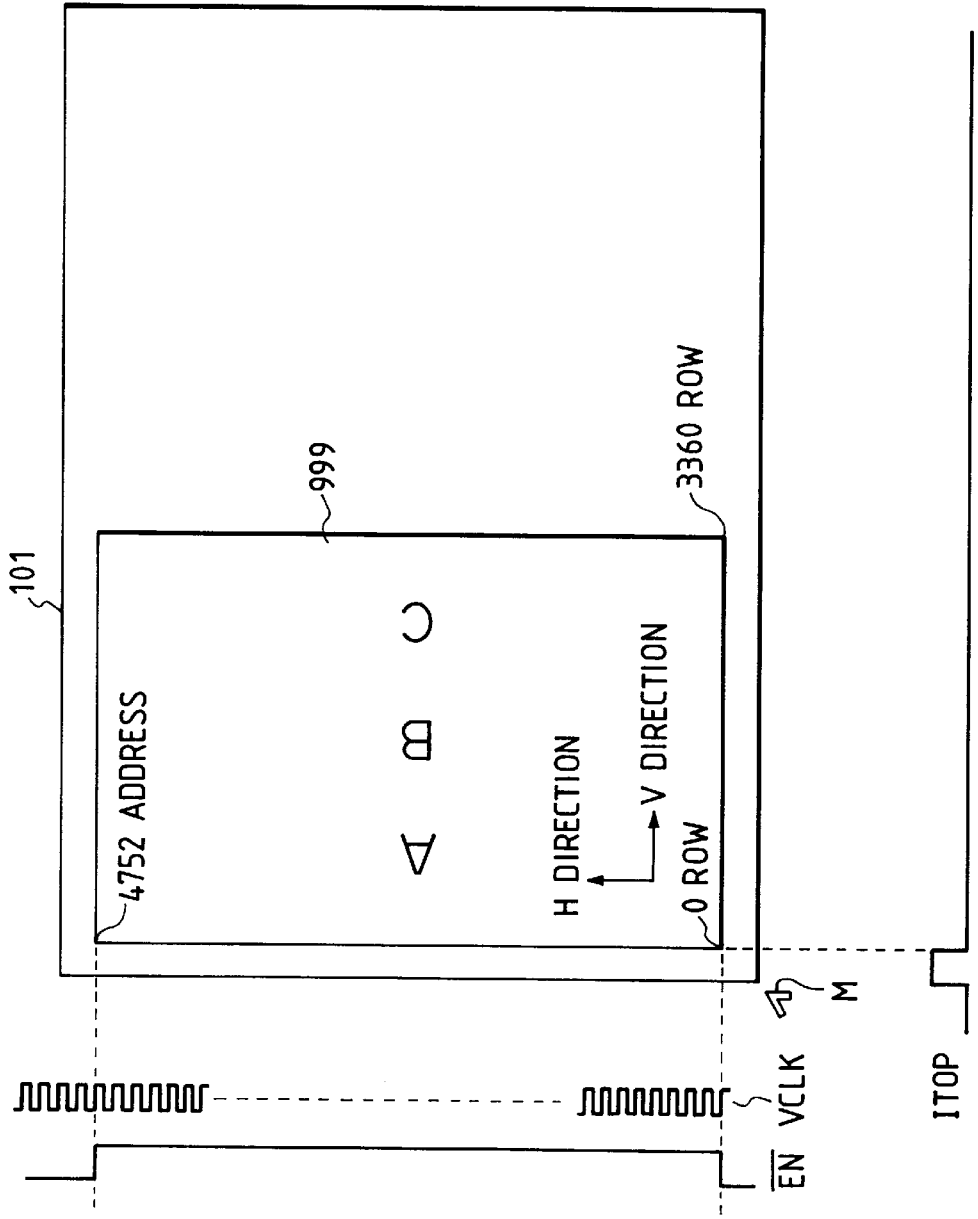

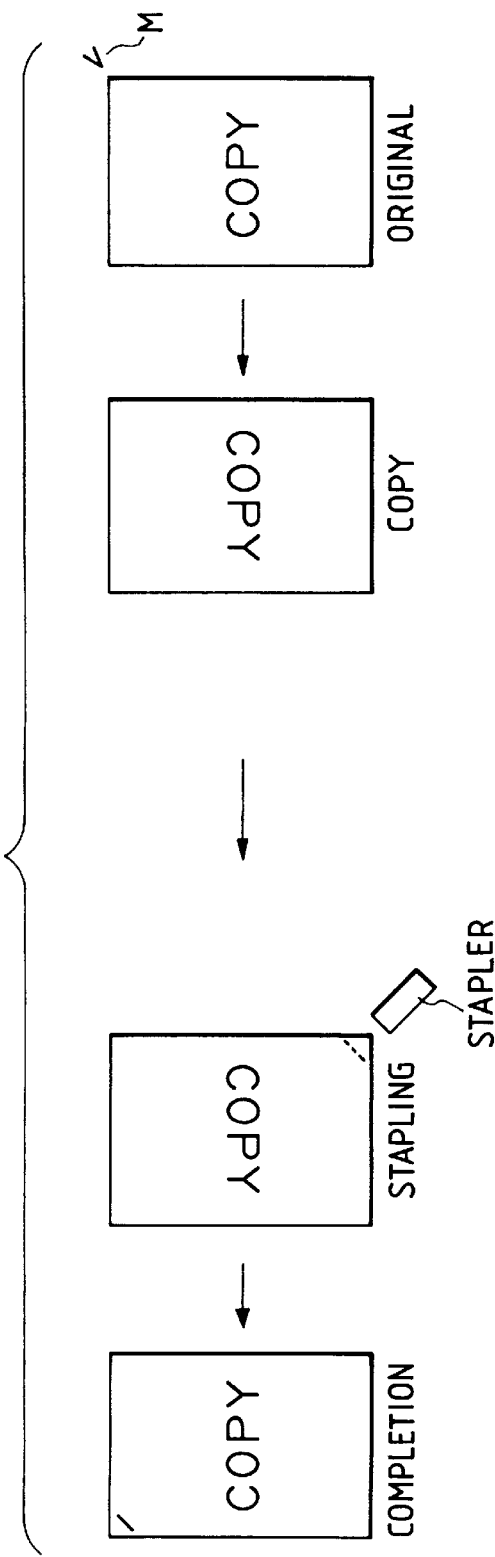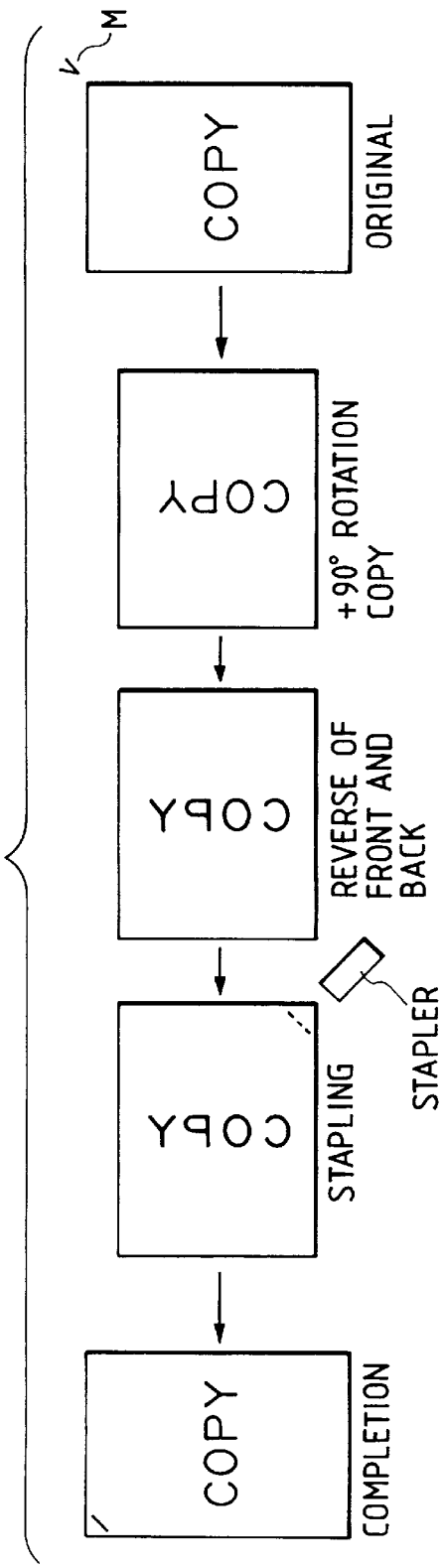

5,913,099

COPY APPARATUS WHICH CONTROLS BINDING POSITION THROUGH IMAGE ROTATION AND SHEET REVERSAL

This application is a continuation of application Ser. No. 08/203,351 filed Mar. 1, 1994 now abandoned.

BACKGROUND OF THE INVENTION

1. Field of the Invention

The present invention relates to a copying apparatus capable of stapling sheets.

2. Related Background Art

A prior art copying apparatus capable of stapling sheets can staple at only a predetermined position regardless of an orientation of an image. As a result, stapling is made at a position other than a top left of the image and this makes the paging of the stapled sheets inconvenient.

SUMMARY OF THE INVENTION

It is an object of the present invention to provide a copying apparatus which solves the above problem.

It is another object of the present invention to provide a copying apparatus capable of stapling at top left of a copied image.

Other objects and features of the present invention will be apparent form the following description of the invention and the drawings.

BRIEF DESCRIPTION OF THE DRAWINGS

FIG. 7 shows a relation between a document sheet on a document sheet table glass and a memory drive signal, FIGS. 20A and 20B show a control status by the copying apparatus.

DETAILED DESCRIPTION OF THE PREFERRED EMBODIMENTS

Embodiment 1

Figure 1:
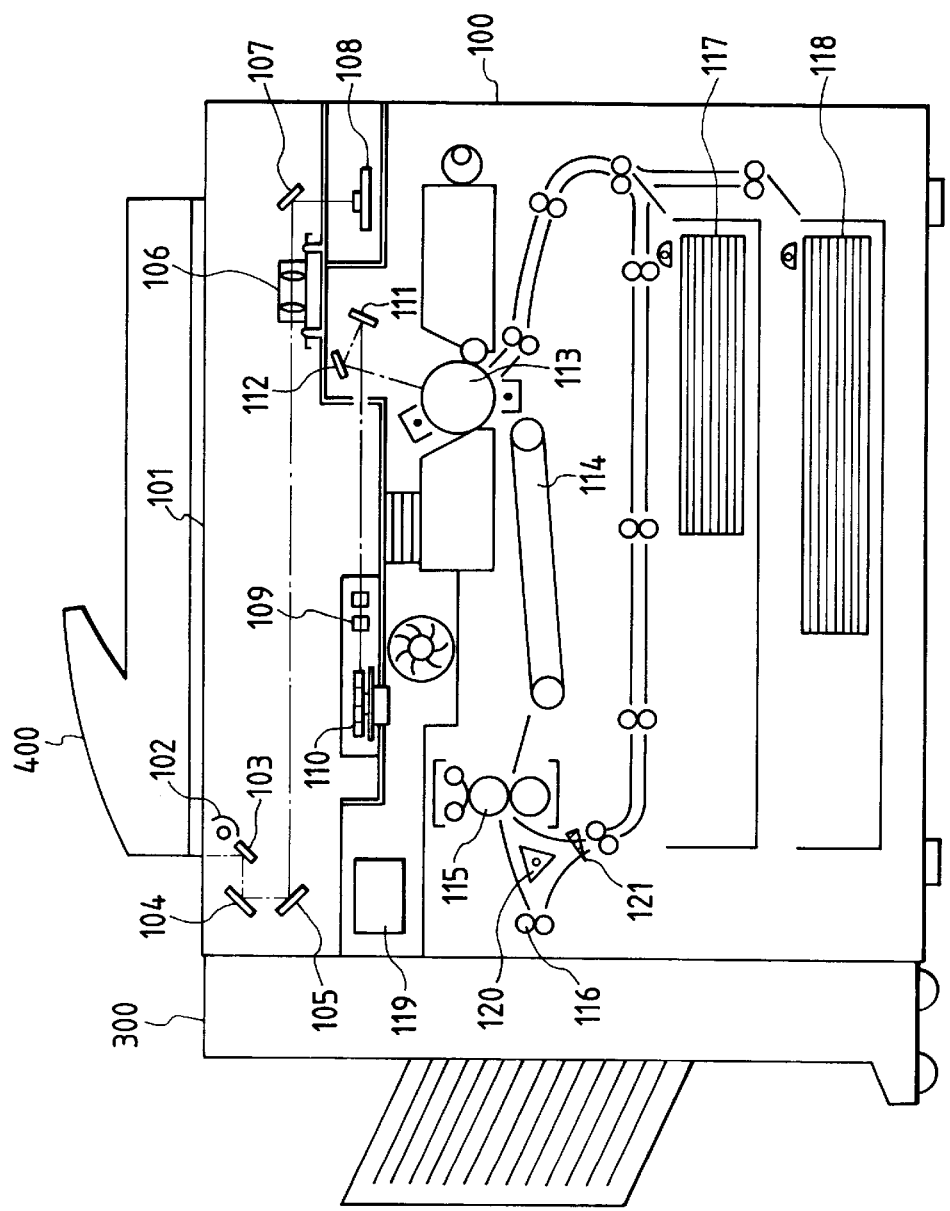
FIG. 1 shows a sectional view of a copying apparatus in accordance with an embodiment of the present invention, FIG. 2 hows a console unit of the copying apparatus.
Figure 2:
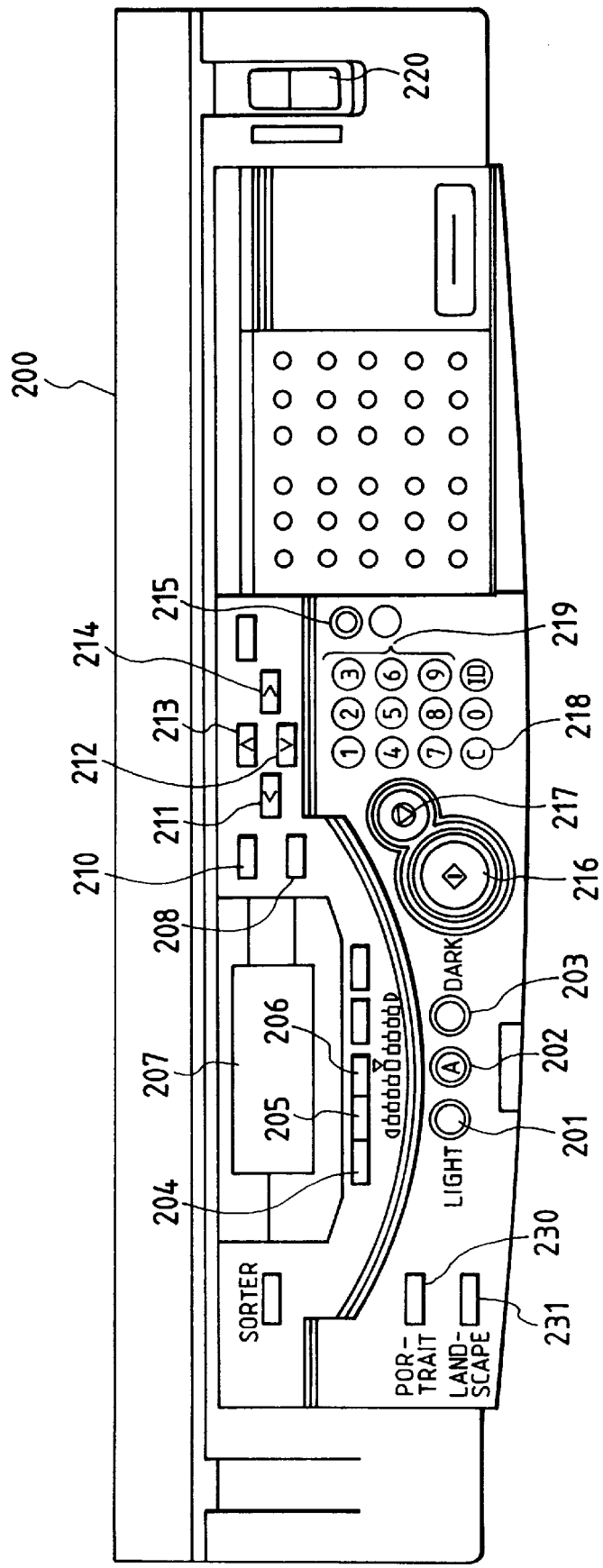
Figure 3A:
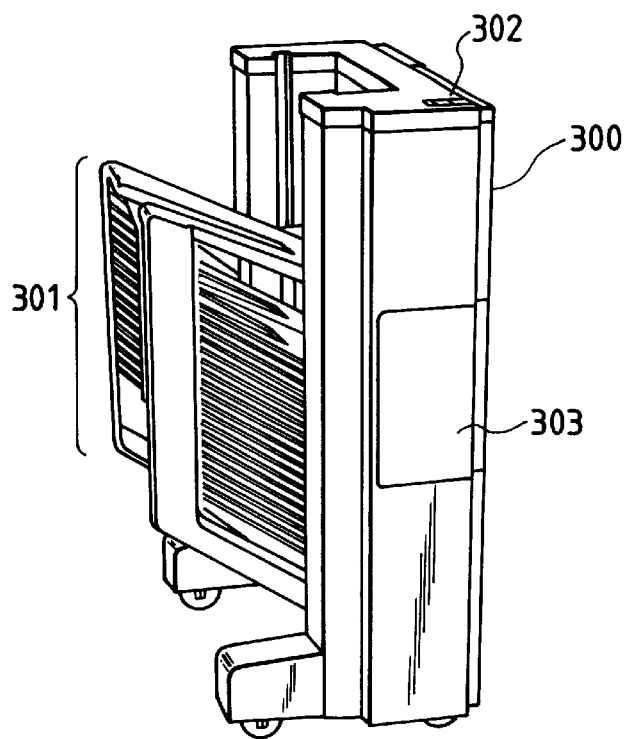
FIGS. 3A and 3B show a staple sorter.
Figure 3B:
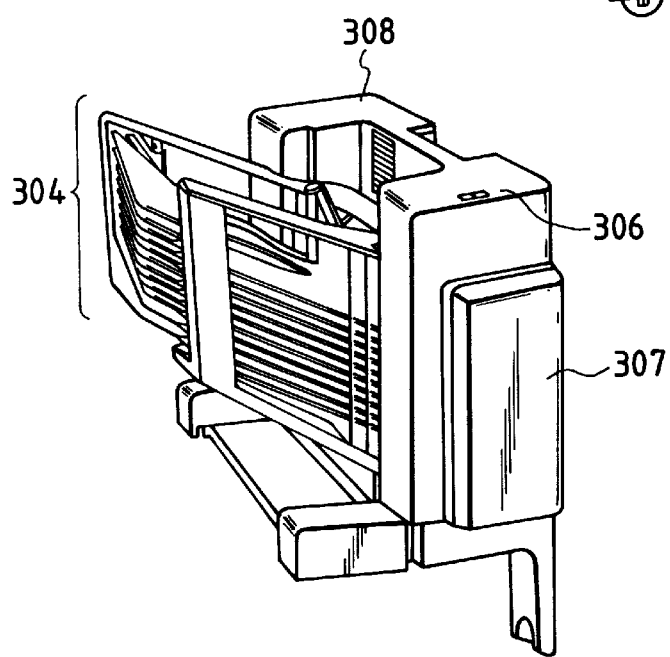
Figure 3C:
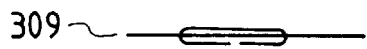
FIGS. 3C and 3D show bent status of staples.
Figure 3D:
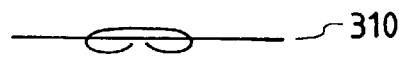
Figure 4:
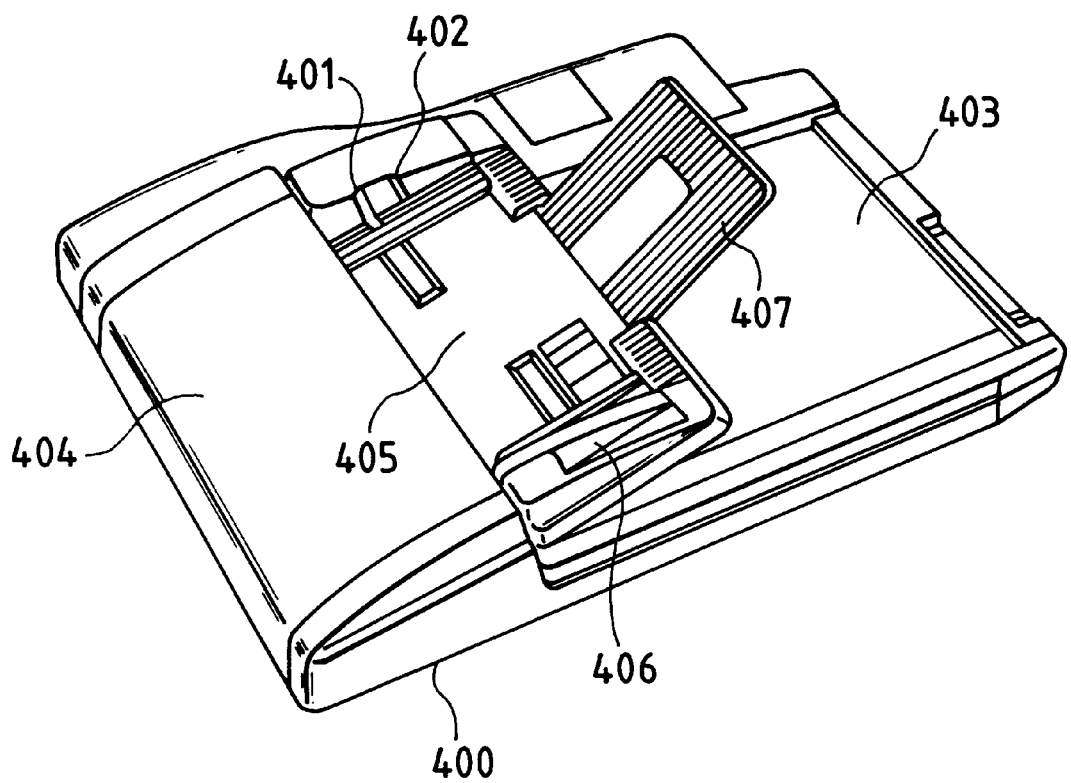
FIG. 4 shows a document sheet feeder.

FIG. 1 shows a sectional view of a construction of a copying apparatus 100 in accordance with an embodiment of the present invention. An operation of the copying apparatus is described. A plurality of document sheets are loaded to a document sheet feeder 400 which feeds the document sheet to a document sheet table glass 101 of the copying apparatus 100 as shown in FIG. 4 and a desired number n of copies is set by a console unit 200 of the copying apparatus 100 as shown in FIG. 2. Numeral 401 in FIG. 4 denotes a separate bar which serves to separate copied document sheets and uncopied document sheets. Numeral 402 denotes a document sheet setting indicator which is turned on when the document sheets are properly set. Numeral 43 denotes a digitizer for specifying an area, numeral 404 denotes a feeder cover, numeral 405 denotes a document sheet tray, numeral 406 denotes a slide guide, and numeral 407 denotes an auxiliary tray. The document sheet feeder 400 is provided with a sensor for detecting a size of a document sheet on a feed path of the document sheet to detect the size and the orientation of the document sheet.

Numerals 201 and 203 of the console unit 200 of FIG. 2 denote density keys and numeral 202 denotes an auto-density key. Numerals 204, 205 and 206 denote magnification setting keys which select reduction, unity magnification and enlargement, respectively. Numeral 207 denotes a display, numeral 208 denotes an asterisk (*) key, numeral 210 denotes an OK key, and numerals 211–214 denote cursor keys. Numeral 215 denotes a key for setting and releasing a pre-heat mode, numeral 216 denotes a copy key, numeral 217 denotes a stop key, numeral 218 denotes a clear key and numeral 219 denotes a ten-key. Numeral 220 in FIG. 2 denotes a main power switch of the copying apparatus 100. Numeral 230 denotes a portrait key which is to be depressed when the document sheet to be viewed in a portrait form in a longitudinal direction is to be copied, and numeral 231 denotes a key which is to be depressed when the document sheet to be viewed in a landscape form in a lateral direction is to be copied.

When an operator competes the setting by the console unit 200, he/she depresses the copy button 216 to start the copying by the copying apparatus 100. When the copy button is depressed, the document sheets are fed from the document sheet feeder 400 to the document sheet table glass 101 of FIG. 1, one sheet at a time. When the document sheet is fed to the document sheet table glass 101, a document sheet illumination lamp 102 is turned on and a first mirror table unit including the document sheet illumination lamp is moved to scan the document sheet. A reflected light of the document sheet illuminated by the document sheet illumination lamp 102 passes through reflection mirrors 103, 104 and 105 and a condenser lens 106, and is decomposed to three principal colors red, green and blue by a diffraction phase grating 107. The decomposed reflected lights are focused to line sensors of a three-line color linear image sensor (CCD) 108. An analog output signal of the CCD 108 is converted to a video signal by an analog processor (not shown) and various image processings are applied by an image processor (not shown). The image-processed video signal is sent to an image memory unit (not shown) or a laser control unit (not shown). The video signal sent to the image memory unit is stored in the image memory unit, and the video signal sent to the laser control unit is converted to a laser control signal. A laser 109 is driven in accordance with the laser control signal and a laser beam passes through a polygon mirror 110 and reflection mirrors 111 and 112 and is directed to a photoconductor drum 113 to form a latent electrostatic image, which is then developed by developing agents of predetermined colors and transferred to an output sheet fed from sheet feeders 117 and 118 at a predetermined timing to form an image. The image formed on the output sheet is sent to a fixing unit 115 by a feeder 114 where it is fixed by thermal fixing, and the thermally fixed sheet is ejected by a sheet ejector 116. It is sorted into a bin 301 of a sorter 300 as shown in FIGS. 3A to 3D in accordance with c preset number of sheets. The sorter 300 has a stapler 307 for stapling at a front corner of the sheet, and a staple start button 302. The copying apparatus 100 may be equipped with a sorter 308 in addition to the sorter 300 and the sorter 308 has a bin 304, a stapler 307 and a staple start button 306. The staplers 303 and 307 can bent staple needles flat as shown by 309 in FIG. 3C. Namely, since it is not bent in a manner shown by 310 in FIG. 3D, no problem is encountered even if the bent side of the staple needle is on a front side.

The image stored in the image memory unit is sent to the laser control unit and converted to a laser control signal to drive the laser 109. The laser beam passes through the polygon mirror 110 and the reflection mirrors 111 and 112 and is directed to the photoconductor drum to form a latent electrostatic image. The latent electrostatic image is developed by developing agents of predetermined colors and it is transferred to an output sheet fed at a predetermined timing to form an image. The image formed on the output sheet is sent to the fixing unit 115 by the feeder 114 and fixed by the thermal fixing and the sheet is ejected by the sheet ejector 116.

Figure 5:
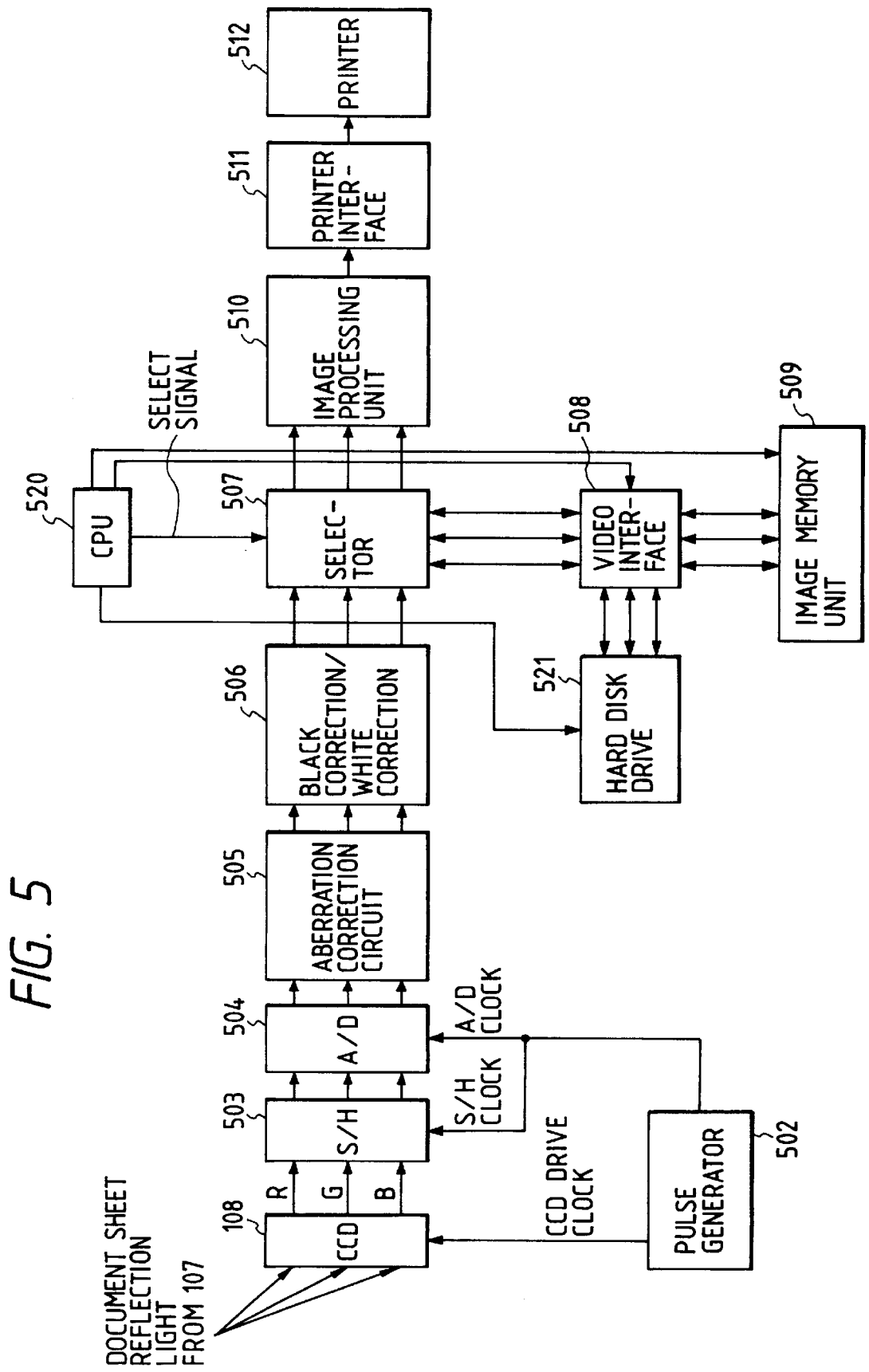
FIG. 5 shows a block diagram of the copying apparatus.

FIG. 5 shows a signal flow chart of the video processing unit. A document image focused on the CCD 108 is converted to analog electrical signals of three principal colors red, green and blue by the CCD 108 which is driven by a CCD drive clock sent from a pulse generator 502. The signals are sampled by a sample/hold circuit (S/H circuit) 503 at a timing of a S/H clock and converted to digital signals by an A/D converter 504. The R, G and B signals converted to video signals by the A/D converter 504 are corrected by an aberration correction circuit 505 for the aberration between the R, G and B data. The corrected video signals are corrected by a black correction/white correction circuit 506 for a black level and a white level of the data.

The image processed video signal is divided by a selector 507 to the memory unit and a printer unit in accordance with a select signal from a CPU 520. Numeral 508 denotes a video interface which interfaces image data between the selector 507 and a hard disk drive 521 and between the hard disk drive 521 and the image memory unit 509 in accordance with a signal from the CPU 520. The image memory unit 510 rotates the image. Numeral 510 denotes an image processing unit which applies shading and inversion of the image read from the document sheet, numeral 511 denotes a printer interface, and numeral 512 denotes a printer for outputting a result of the process, which comprises the laser 109, the photoconductor drum 113 and the fixing unit 115. The hard disk drive 521 can store approximately 100 sheets of image.

In the above configuration, the image data of full page document sheet supplied from the CCD 108 is stored in the hard disk drive 521 through the selector 507 and the video interface 508. The image data can be read from the hard disk drive in an ascending page order or descending page order by a command from the CPU 520. The image data is sent to the image memory unit 509 through the video interface 508 and it is rotation-processed. The image memory unit 509 does not carry out the rotation process unless a rotation command is applied from the CPU 520. The image data from the image memory unit 509 is sent to the selector 507 through the video interface 508.

Figure 6B:
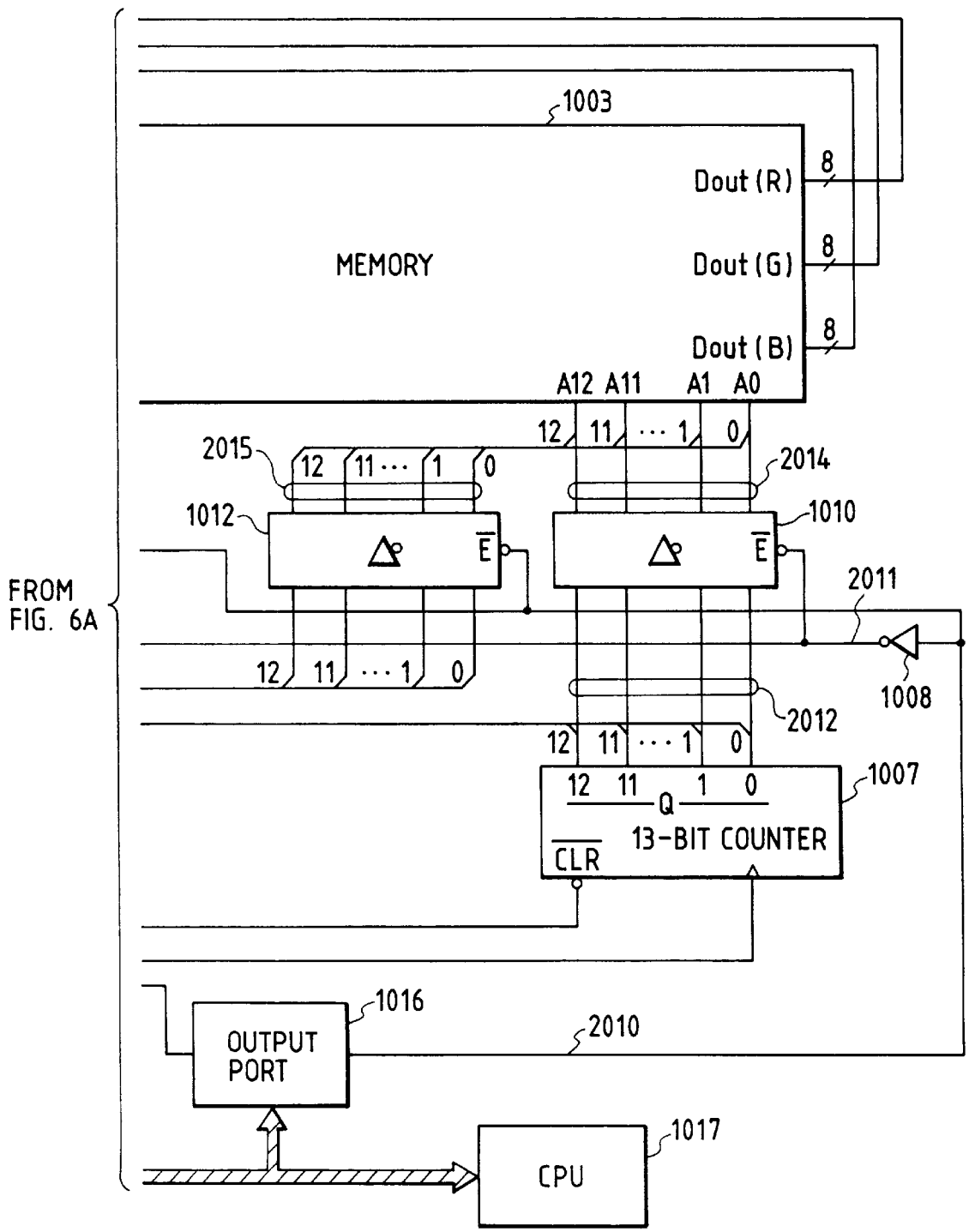
FIG. 6 is comprised of FIGS. 6A and 6B showing configurations of an image memory unit.

The image memory unit 509 is now explained. FIGS. 6A and 6B show detailed circuit diagrams for illustrating a configuration of the image memory unit of the image forming apparatus of the present embodiment. In FIGS. 6A and 6B, numeral 1001 denotes a connector, numeral 1002 denotes a selector, numeral 1003 denotes a memory, numerals 1004, 1005 and 1008 denote inverters, numerals 1006 and 1007 denote 13-bit counters, numerals 1009, 1010, 1011 and 1012 denote tri-state buffers, and numeral 1013 denote a communication control unit. Numeral 1017 denotes a CPU for controlling the entire image memory unit, numeral 1014 denotes a ROM which stores various programs to be executed by the CPU 1017, numeral 1015 denotes a RAM which serves as a work area to be used when various programs of the ROM 1014 are to be executed, and numeral 1016 denotes an output port. Numerals 2001R, 2001G, 2001B, 2007R, 2007G, 2007B, 2019R, 2019G, 2019B, and 2012–2017 denote signal lines, numeral 2002 denotes an ITOP signal, numeral 2003 denotes an EN signal, numeral 2004 denotes a video clock (VCLK), numeral 2005 denotes a communication signal (COM), numeral 2006 denotes a select signal, numeral 2008 denotes an ITOP signal, numeral 2009 denotes an EN signal, numeral 2010 denotes a control signal, and numeral 2018 denotes a bus line for transmitting address signals, data and control signals.

An operation of the above configuration is now explained. The connector 1001 is connected to the video interface of FIG. 5 through a cable. The R data, G data and B data are supplied to the signal lines 2001R, 2001G and 2001B, respectively, through the connector 1001. The control signal and the communication signal are also supplied to the signal lines 2002–2005 through the connector 1001. The image signals (2001R', 2001G' and 2001B') on the signal lines 2001R, 2001G and 2001B are supplied to the selector 1002. In the image store mode, the selector 1002 is set to a position A by the select signal 2006 and the input image signals 2001R', 2001G' and 2001B' (which are collectively referred to as image information 2001) are supplied to the memory 1003 through the signal lines 2007R, 2007G and 2007B. The ITOP signal 2002 is inverted by the inverter 1004 and supplied to a clear terminal of the counter 1006 as the ITOP signal 2008. The EN signal 2003 is inverted by the inverter 1005 and supplied to a clock input terminal of the counter 1006 and a clear terminal of the counter 1007 as the EN signal 2009. The VCLK is supplied to a clock input terminal of the counter 1007.

A storing method to the memory 1003 is explained in detail for a document sheet of a size A4. FIG. 7 shows an example in which a document sheet 999 of the size A4 is mounted on the document sheet table glass 101, as viewed from the bottom of the document sheet table glass 101. Thus, a reference mark M is at a left rear side of the document sheet table glass 101. FIG. 7 also shows a control signal from the video processing unit. The present color reader reads the document sheet 999 at 16 dots/mm and converts it to digital information. After full page of document sheet has been stored in the hard disk drive 521, it is sent to the image memory unit 509 (FIGS. 6A and 6B) in the descending page order or ascending page order. When the document is set in alignment with the reference mark M, the horizontal (H) direction of the document sheet corresponds to addresses 0–4752 as shown, and the vertical (V) direction corresponds to addresses 0–3360. The control signals EN 2003, VCLK 2004 and ITOP 2002 are generated at the timing shown in FIG. 7 and they are supplied to the image memory unit 509.

Figure 8:
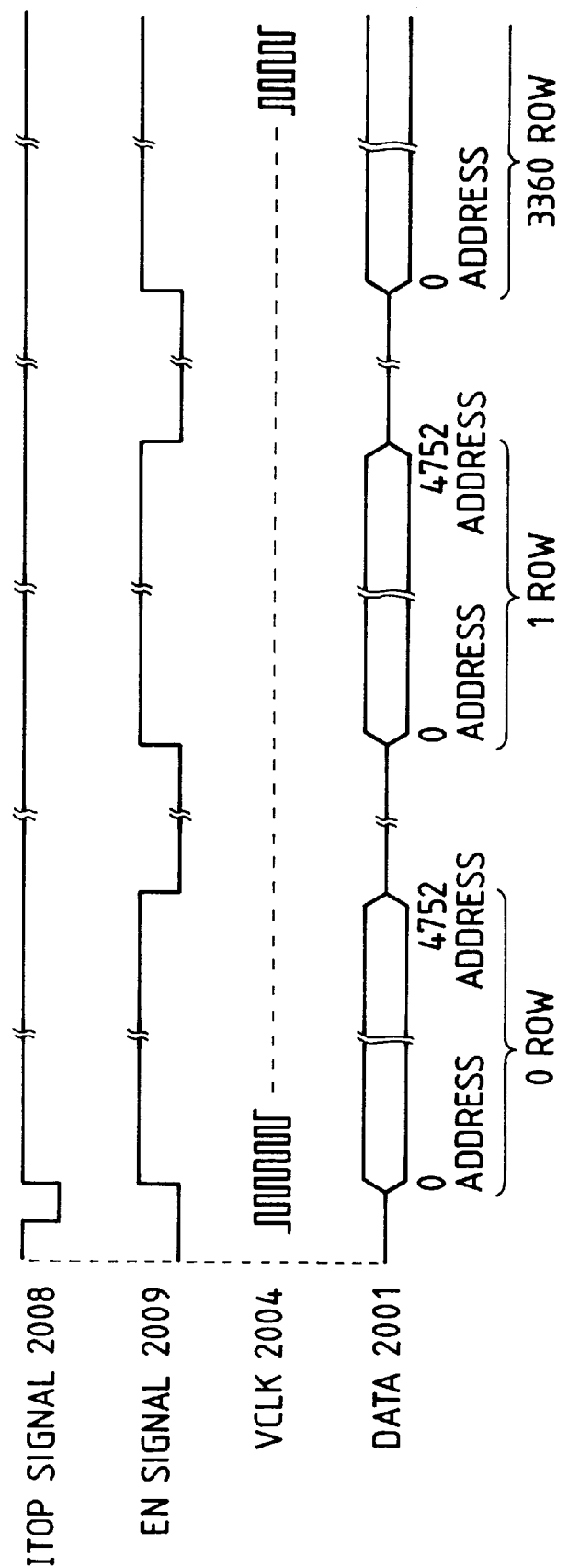
FIG. 8 shows a relation between memory drive signals.

FIG. 8 shows a timing chart of signals in the image memory unit 509 in the present embodiment corresponding to the control signals and the image signals from the video interface 508 of the video processing unit shown in FIG. 5. It shows a timing chart to store the image signal supplied from the signal line 2001 to the memory 1003. When the ITOP control signal 2008 is logical "0", the counter 1006 is cleared so that the counter output 2013 is all-logical "0". The EN signal 2009 is now "0" and the counter 1007 is cleared so that the counter output supplied to the signal line 2012 is all-"0". When the ITOP signal changes from "0" to "1", the effective image information 2001 of the document sheet is outputted and the EN signal 2009 changes from "0" to "1". The VCLK 2004 is always outputted from the connector 1001. When the EN signal 2009 changes to "1", the counter 1007 is released from the clear state and the incremented count is outputted to the signal line 2012 in synchronism with the VCLK 2004. When a time duration corresponding to 4752 VCLK 2004 elapses after the change of the signal level of the VCLK from "0" to "1", the VCLK 2004 again changes to "0". The output of the counter 1007 assumes the count of 0–4752 by the control of the EN signal 2009.

After the counter 1006 has been cleared by the ITOP signal 2008, it is incremented by one each time the EN signal 2009 is changed from "0" to "1". Namely, the counter 1007 outputs the address of the H direction and the counter 1006 outputs the address (row) of the V direction. The output of the counter 1007 is supplied to the tri-state buffers 1010 and 1011 through the signal lines 2012. The output of the counter 1006 is supplied to the tri-state buffers 1009 and 1012 through the signal line 2013. When the image information of the memory 1003 is to be supplied through the signal lines 2007R, 2007G and 2007B, the tri-state buffers 1009 and 1010 are activated by the control signal 2010 from the output port 1016. The output of the counter 1007 is supplied to A0–A12 of the memory 1003 through the signal line 2012 and the tri-state buffer 1010 and through the signal line 2014. The output of the counter 1006 is supplied to A13–A25 of the memory 1003 through the signal line 2013 and the tri-state buffer 1009 and through the signal line 2016. Namely, the memory 1003 has 26-bit addresses A0–A25, and A0–A12 and A13–A25 are controlled by the outputs of the different counters 1006 and 1007. In this manner, the input image data is written into the rows 0–3360 of the memory 1003.

Figure 9:
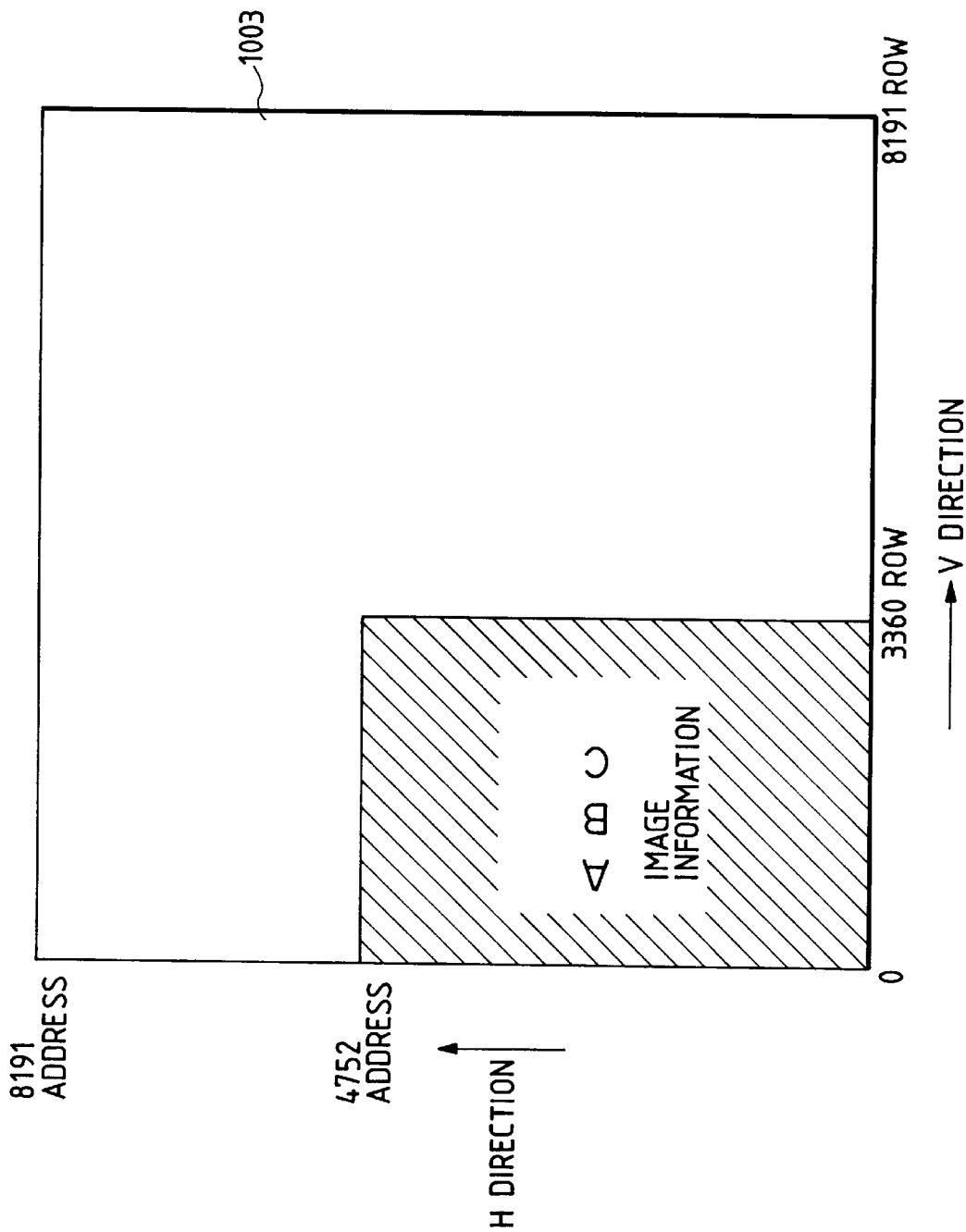
FIG. 9 shows a relation between a memory space and a document sheet.

FIG. 9 shows an address space of the memory 1003 in the present embodiment. As shown in FIGS. 6A and 6B, the outputs of the counters 1006 and 1007 have 13 bits, respectively, and they are supplied to the addresses A0–A12 and A13–A25 of the memory 1003, respectively. Thus, $2^{13}=8192$ addresses can be specified, and the addresses 0–8191 in the H direction and the rows 0–8191 in the V direction can be addressed. When the image information 2001 is applied to the memory space shown in FIG. 9 at the timing shown in FIG. 8, an occupied area is shown by hatching in FIG. 9. The image information 2001 is stored in the memory 1003 in accordance with the address of the document sheet 999. Namely, when the image information of the size A4 is stored in the memory 1003 and the output sheet and the direction of the document sheet are identical, the image information is not stored in the image information memory 1003 but it may be directly supplied to the color printer from the color reader. By the configuration of FIG. 5, the reading and the outputting may be simultaneously carried out.

Figure 10:
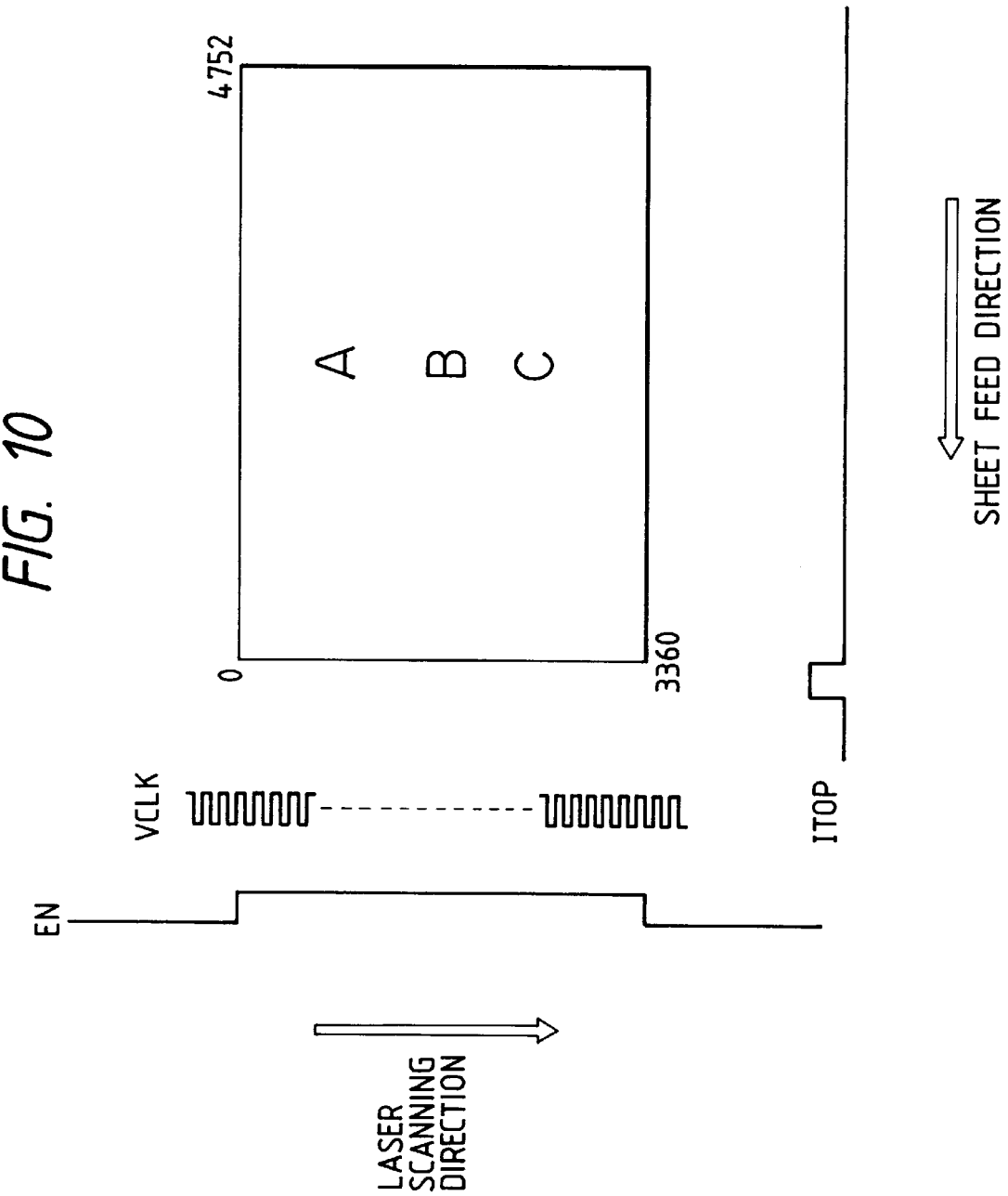
FIG. 10 shows a relation between image information on a memory and a read signal.

A read method with 90° rotation is now explained. Prior to the 90° rotation, the image signal is transmitted from the image memory unit 509 to the video unit by the video interface 508 of the color reader. The CPU 1017 of the image memory unit 509 controls the output port 1016 to set the selector 1002 to the position B to render the tri-state buffers 1009 and 1010 of the tri-state buffers 1009–1012 to a high impedance state. The control unit in the color reader acquires the information on the type of sheet loaded in the sheet feed cassette 117 (FIG. 1) of the printer through the cable. In the present embodiment, A4R sheets are set in an upper stage as shown in FIG. 1, and based on this information, the video processing unit in the color reader outputs the EN signal, the VCLK and the ITOP signal shown in FIG. 10 in the image formation mode. The ITOP signal activates a timing roller in front of the photoconductor drum so that it is turned on when the sheet is fed. The VCLK is continuously outputted at a frequency corresponding to one pixel of the laser. Since the recording density is 16 dots/mm, the number of VCLK's in the direction of the laser scan is 210 mm×16 dots=3360 dots so that the EN signal is logical "0" while the 3360 clocks are supplied. The control signal which is outputted from the video processing unit and supplied to the image memory unit 509 is supplied to the counters 1006 and 1007. The EN signal is supplied to the clock input terminal of the counter 1006 and the clear terminal of the counter 1007. The VCLK signal is supplied to the clock input terminal of the counter 1007 and the ITOP signal is supplied to the clear terminal of the counter 1006.

Figure 11:
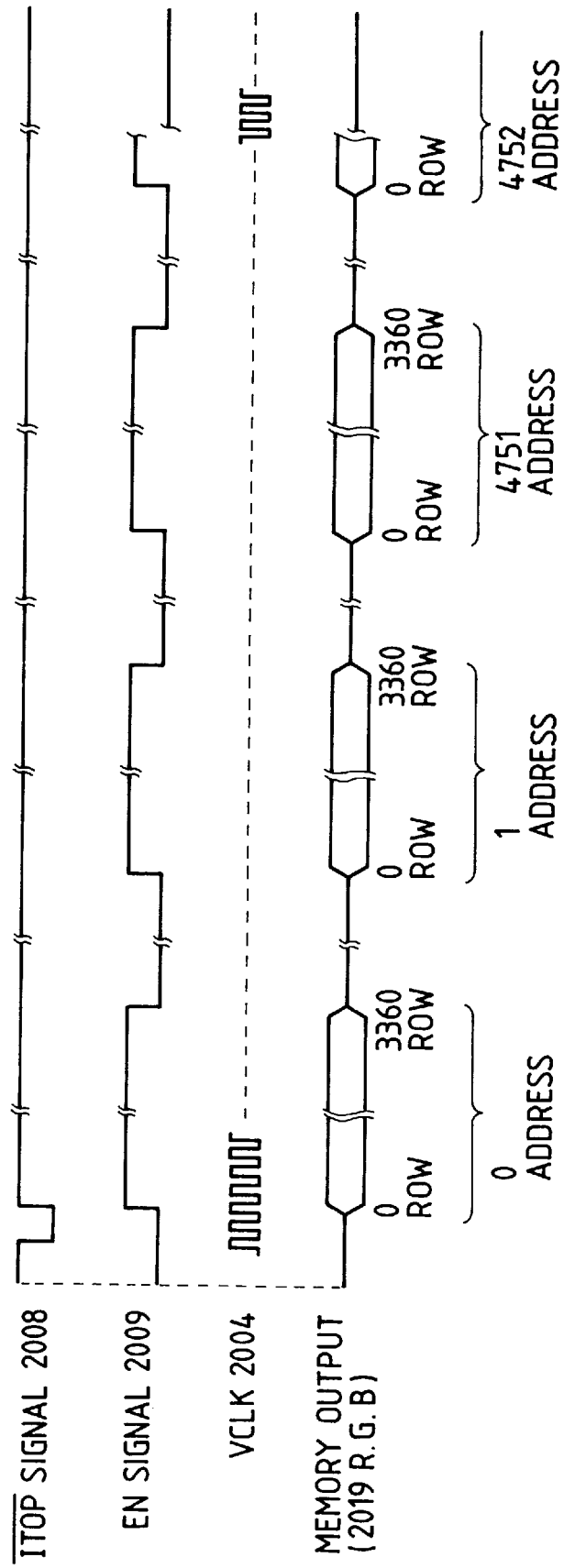
FIG. 11 shows a relation between memory drive signals.

FIG. 11 shows a timing chart of the control signal in the image forming apparatus of the present embodiment. When the EN signal 2009 shown in FIG. 11 is logical "0", the counter 1007 is cleared so that the counter output supplied to the signal line 2012 is all-logical "0". When the ITOP signal 2008 is logical "0", the counter 1006 is cleared so that the counter output supplied to the signal line 2013 is all-logical "0". When the VCLK 2004 is supplied after the EN signal 2009 is changed to logical "1", the counter 1007 outputs the incremented count to the signal line 2012. The counter output supplied to the signal line 2012 is supplied to the address terminals A13–A25 of the memory 1003 through the activated tri-state buffer 1011. When the EN signal 2009 is supplied to the counter 1006 after the ITOP signal 2008 has been changed to logical "1", the incremented output is supplied to the signal line 2016. The output of the counter 1006 is supplied to the address terminals A0–A13 of the memory 1003 through the activated tri-state buffer 1012.

Figure 12:
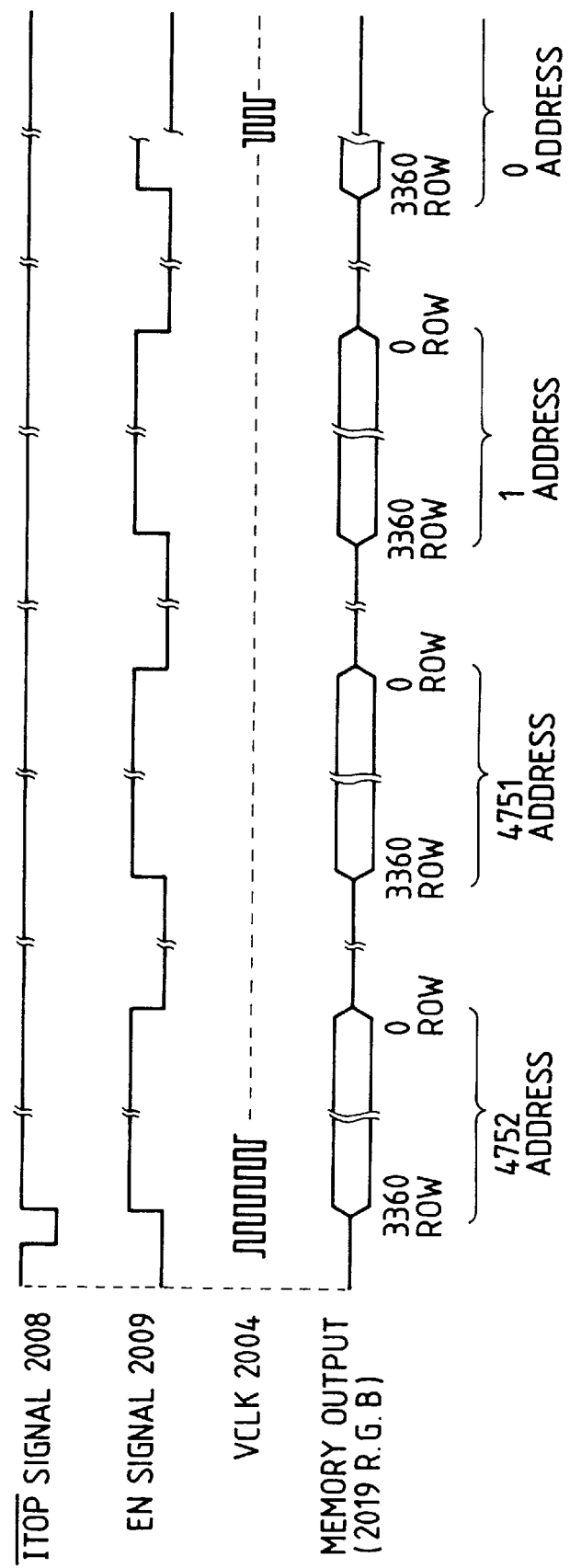
FIG. 12 shows a relation between memory drive signals.

The fact that the signal of the counter 1006 is supplied to the terminals A0–A12 of the memory and the output signal of the counter 1007 is supplied to the terminals A13–A25 of the memory indicates that the outputs of the counters 1006 and 1007 in the image memory mode are exchanged. In the read mode of the image information shown in FIG. 9, since the counter outputs have been exchanged, the information is first read in the V direction of FIG. 9, and the output of the H direction counter 1006 is incremented each time one line is read to read the next V direction line. This process is shown in FIG. 11. In FIG. 11, the memory output, that is, the signals supplied to the signal lines 2019R, 2019G and 2019B are data derived by reading the data of the V direction rows 0–3360 at the H direction address 0 and then reading the V direction rows 0–3360 at the H direction address 1. By repeating the above process until the address 4752 so that the image information which is originally of A4 size is rotated by 90° and read from the memory 1003 in the A4R form. As shown in FIG. 12, the memory output, that is, the signals supplied to the signal lines 2019R, 2019G and 2019B are derived by reading the data in the reverse V direction rows 3350–0 at the H direction address 4752 and then reading the data of the reverse V direction rows 3360–0 at the H direction address 4751. Thus, the image information which is originally of A4 size is rotated by the reverse 90°, that is −90° and read from the memory 1003 in the A4R form. When the rotation is not applied, the image may be read in the order of writing into the memory 1003. The control is effected by the CPU 1017 which is controlled by the CPU 520.

Figure 13A:
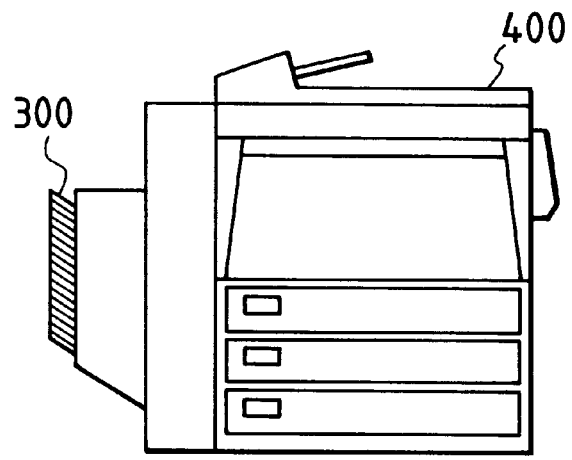
FIGS. 13A and 13B show relations between a document sheet to be read in a normal read mode and a staple position on a sheet after copying.
Figure 13B:
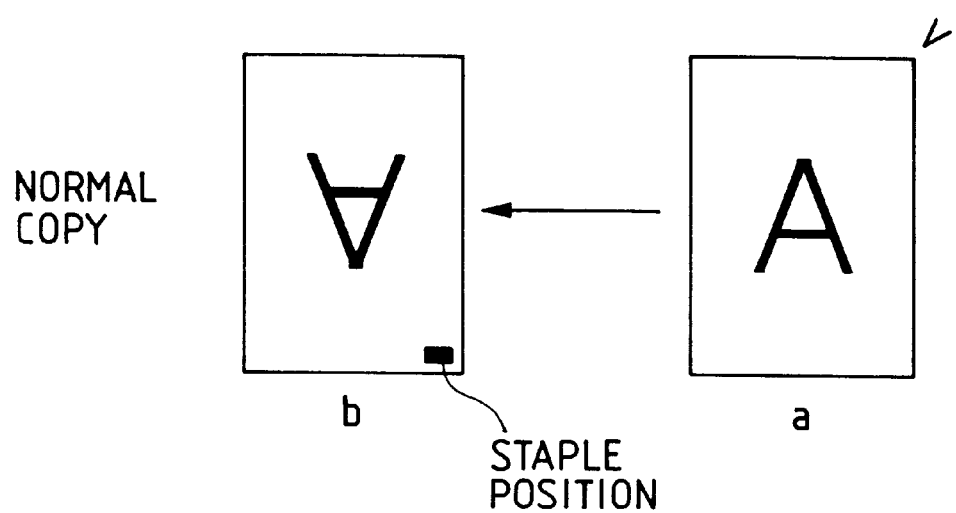
Figure 14:
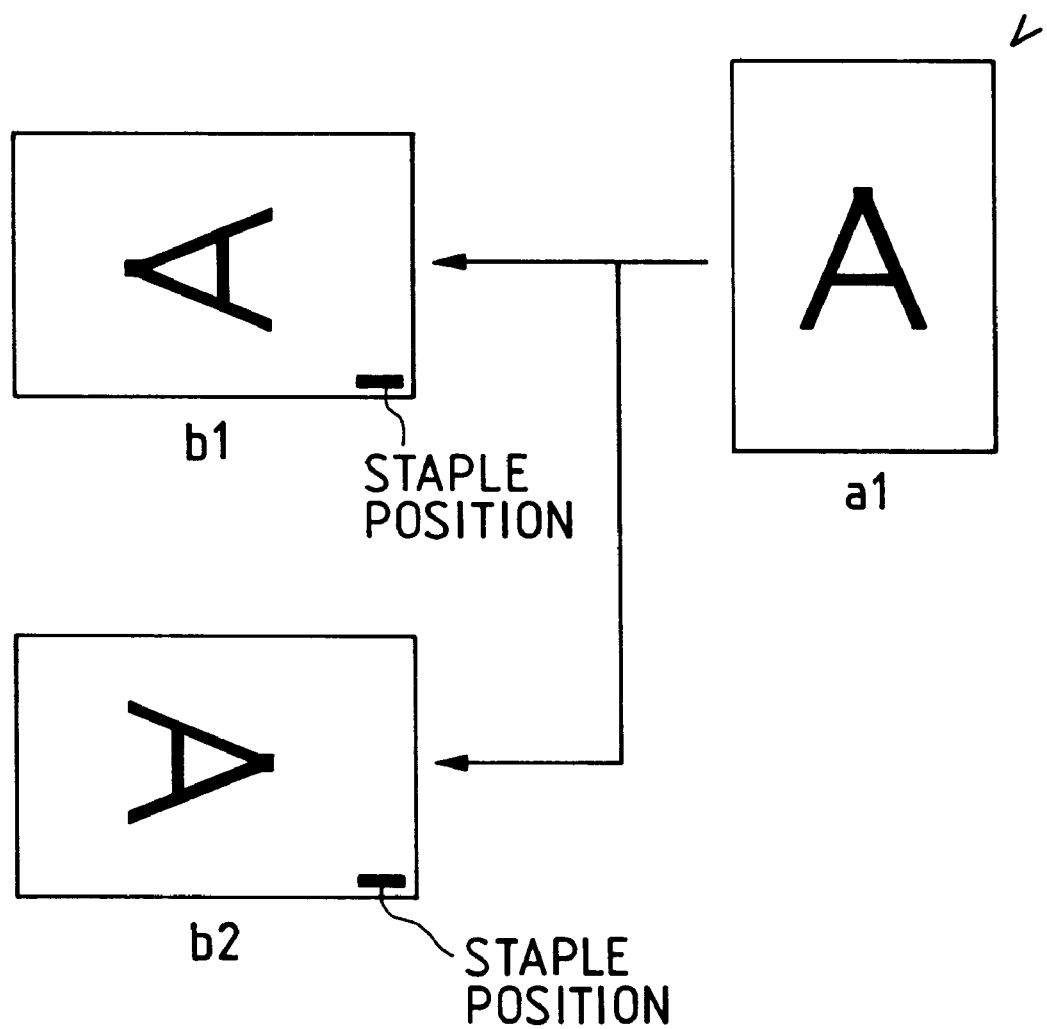
FIG. 14 shows an output image by rotation control.

The present embodiment is briefly explained. FIGS. 13A and 13B show an example of staple sort. In FIG. 13B, a shows a direction of a document sheet to be set in the document sheet feeder 400, and b shows a direction of a copy sheet in a normal copy mode, that is, copied without image rotation and stapled. The staple position is a left top position of the image on the sheet as shown in the copy b. FIG. 14 shows an example in which the read document sheet image is rotated by 90° and copied and stapled. In FIG. 14, b1 shows a copy of the document sheet a1 with +90° rotation, and b2 shows a copy with −90° rotation. The manner of rotation is same as that described above.

Embodiment 2

Figure 15A:
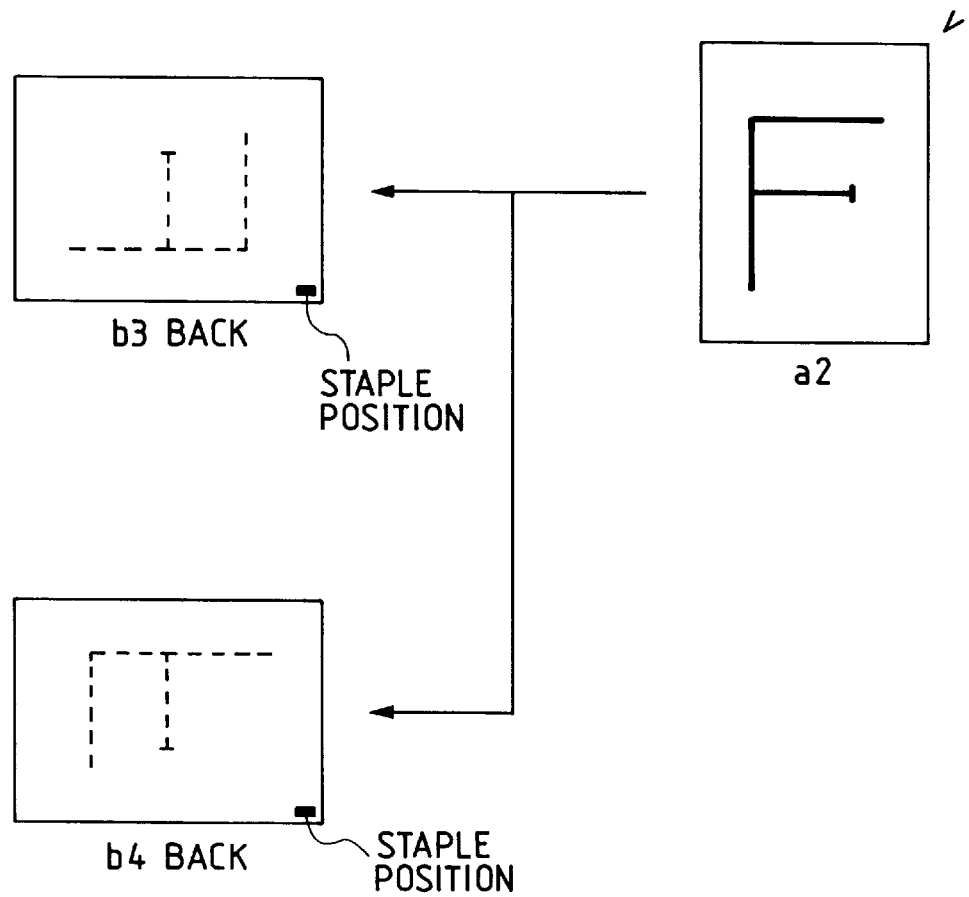
FIGS. 15A to 15C show output images by back side sheet ejection.
Figure 15B:
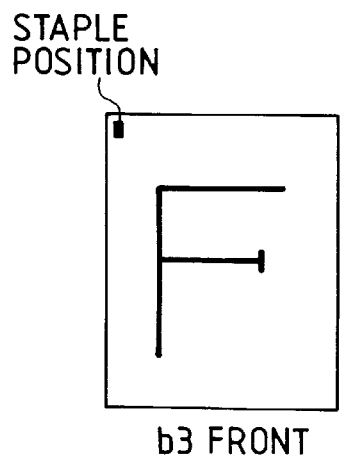
Figure 15C:
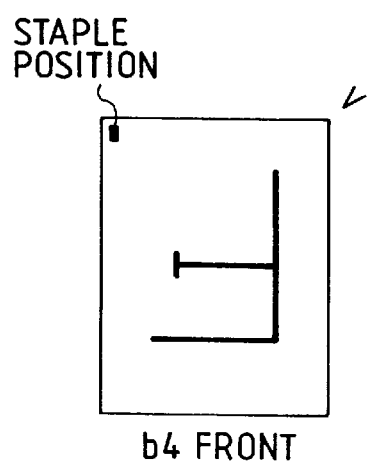
Figure 16:
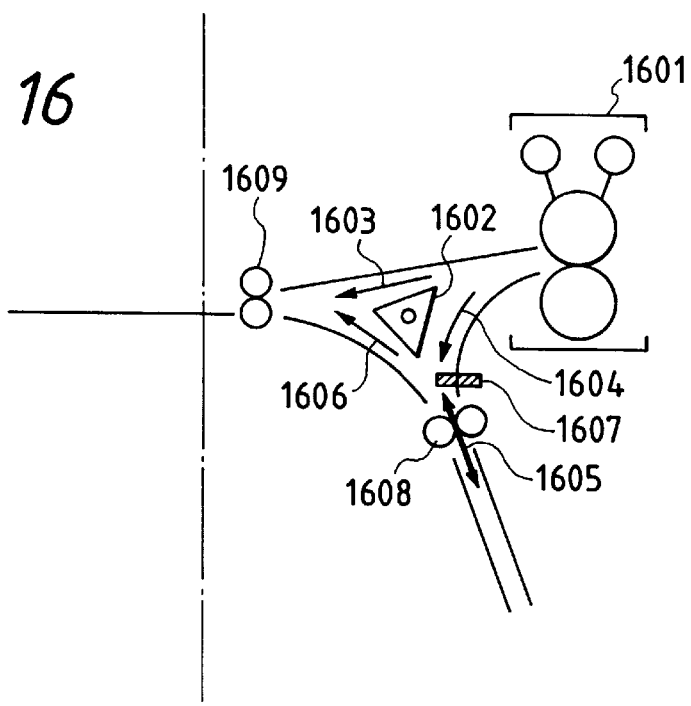
FIG. 16 shows a back side sheet ejection mechanism.
Figure 17C:
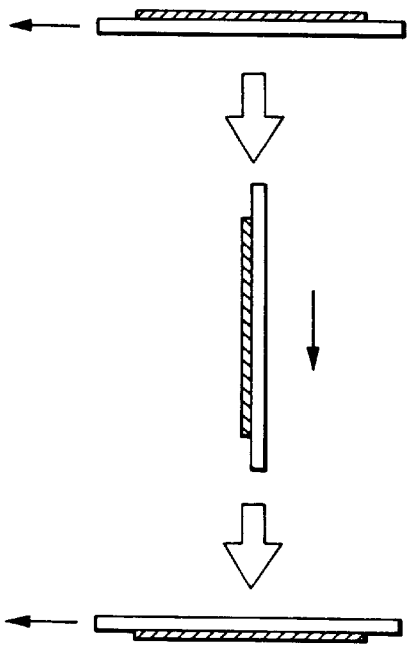
FIGS. 17A, 17B and 17C show an operation of the back side sheet ejection, FIG. 18 show an output image by the back side sheet ejection and the image rotation.
Figure 17B:
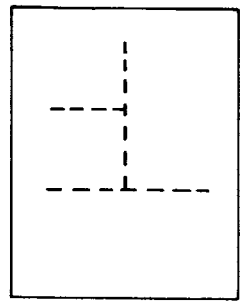
Figure 17A:
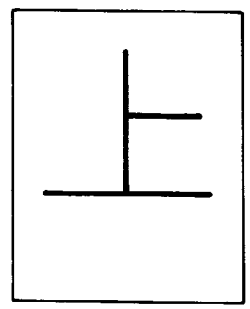
Figure 18:
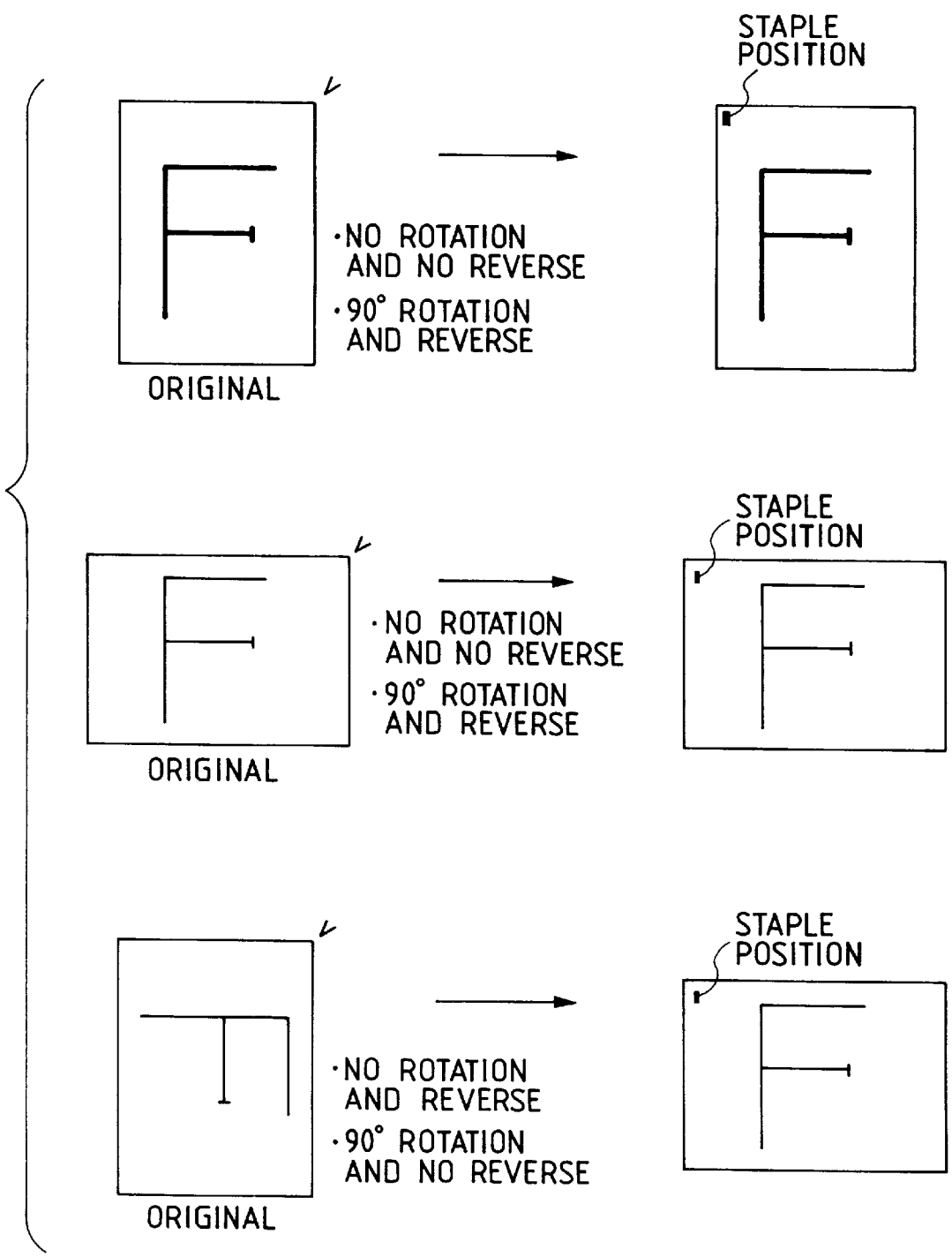

A second embodiment is now explained. As shown in FIG. 16, a record sheet fixed by a fixing unit 1601 is fed by a flapper 1602 to a lower feed unit of a copying apparatus. The record sheet is fed in a direction 1604 and a timing to reverse the feed direction is measured by a timer from the time when a leading edge of the record sheet passes through a sensor 1607. When the timer counts a predetermined time interval, a lower feed roller 1608 is reversely rotated so that the record sheet is fed to the sheet ejection unit as shown by arrows 1605 and 1606 and ejected by a sheet ejection unit 1609. A front/back side state of the sheet feed is shown in FIG. 17C. FIG. 17A shows a state of the record sheet after the passage of the fixing unit 1601. When it is fed as shown by an arrow 1603, the record sheet is in the state shown in FIG. 17A, and when it is fed through the path shown by an arrow 1604, the record sheet is ejected in the reverse face-down as shown in FIG. 17B. Examples of output are shown in FIGS. 15A to 15C in which a2 shows a set direction of the document sheet, and b3 back shows a state derived by rotating the image by 90° and further inverting it (FIG. 15A). In this manner, the staple can be applied at the left top position of the record sheet. In FIG. 15A, b4 back shows a state derived by rotating the image by −90° and further inverting it. Views from the front side are shown in b3 front (FIG. 15B) and b4 front (FIG. 15C). FIG. 18 shows a relation between the image rotation, the back side sheet ejection (reversal) and the staple position.

Embodiment 3

Figure 19A:
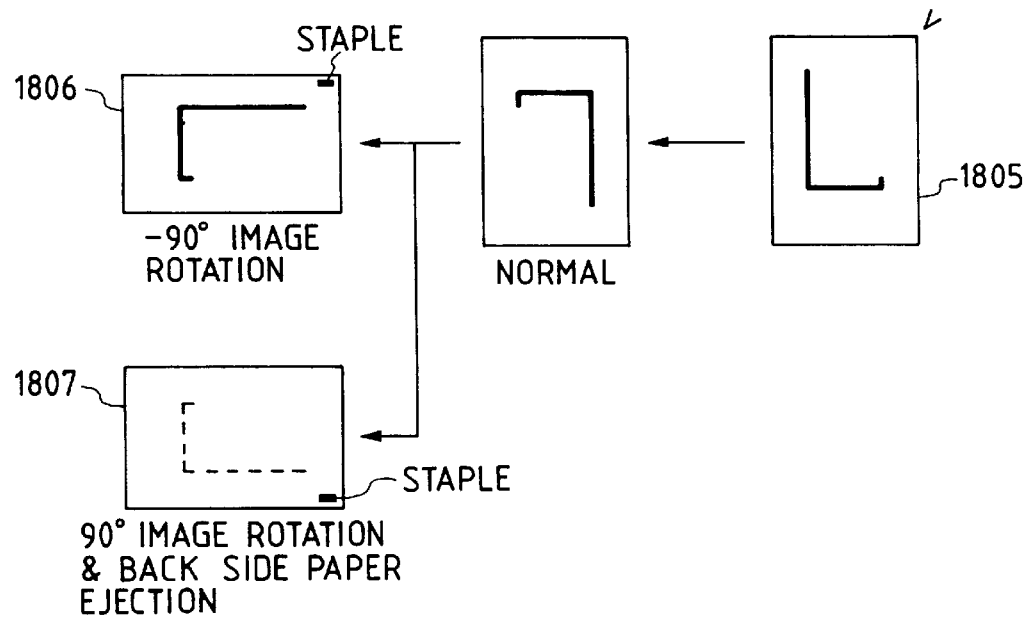
FIGS. 19A and 19B show a control status by the back side sheet ejection and the image rotation and means therefor.
Figure 19B:
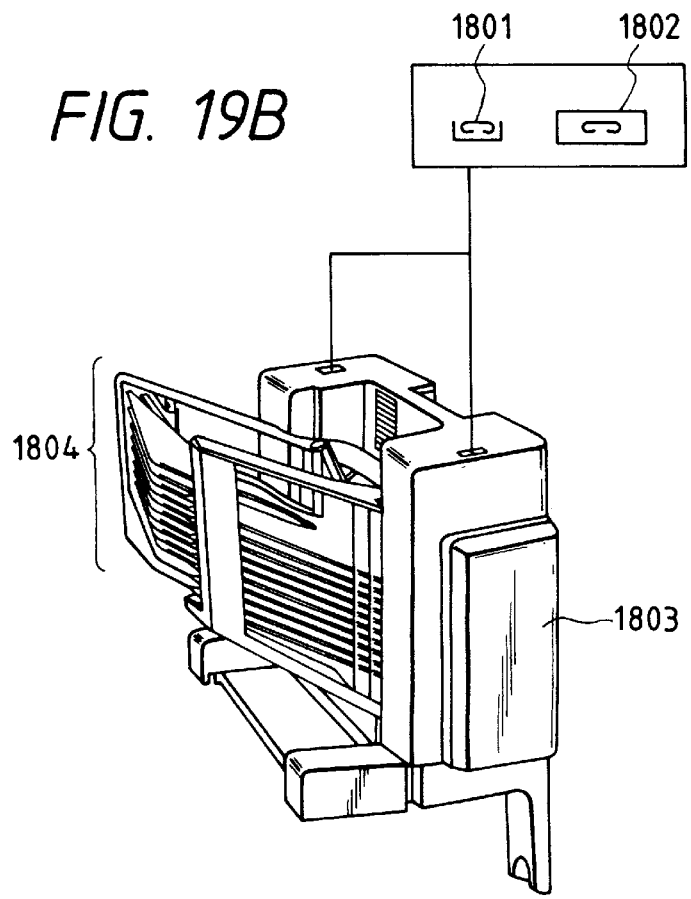

A third embodiment is now explained. As shown in FIGS. 19A and 19B, when a document sheet 1805 is set to a document sheet feeder and the image is rotated by −90°, the staple may be applied at the left top position of the record sheet by selecting a rear stapler by a sorter having staplers at front and rear positions, as shown by 1806. When the image is rotated by 90° and the sheet is ejected back side up, the staple can be applied at the left top position of the record sheet by selecting the front stapler as shown by 1807. Numeral 1801 denotes a needle refill indicator which is turned on when needles are exhausted, numeral 1802 denotes a manual staple key for indicating manual stapling, numeral 1803 denotes a staple unit cover and numeral 1804 denotes a sort pin. In the present embodiment, a plurality of staple means are provided and the staple position is selected by the output manner to attain the same effect.

The record sheet may be inverted when the document sheet is fed in the direction R (longitudinally of the document sheet) by the document sheet feeder so that the staple is applied at the left top position of the record sheet, or the front and rear staplers may be selectively used inserted of the inversion of the record sheet so that the staple is applied at the left top position of the record sheet.

Figure 22A:
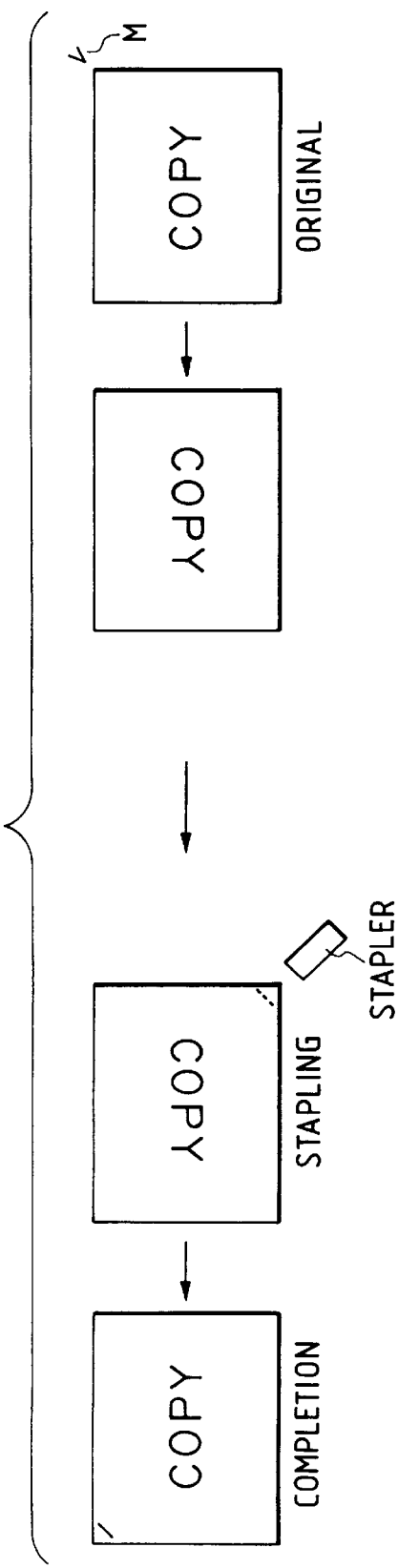
FIGS. 22A and 22B show a control status by the copying apparatus.
Figure 22B:
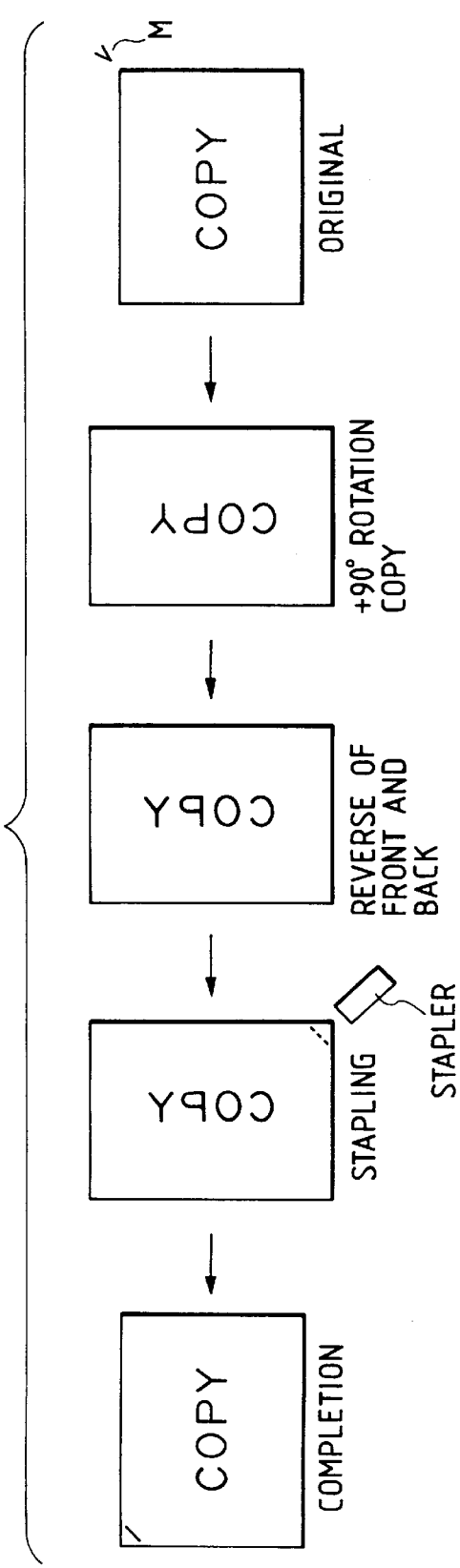
Figure 23:
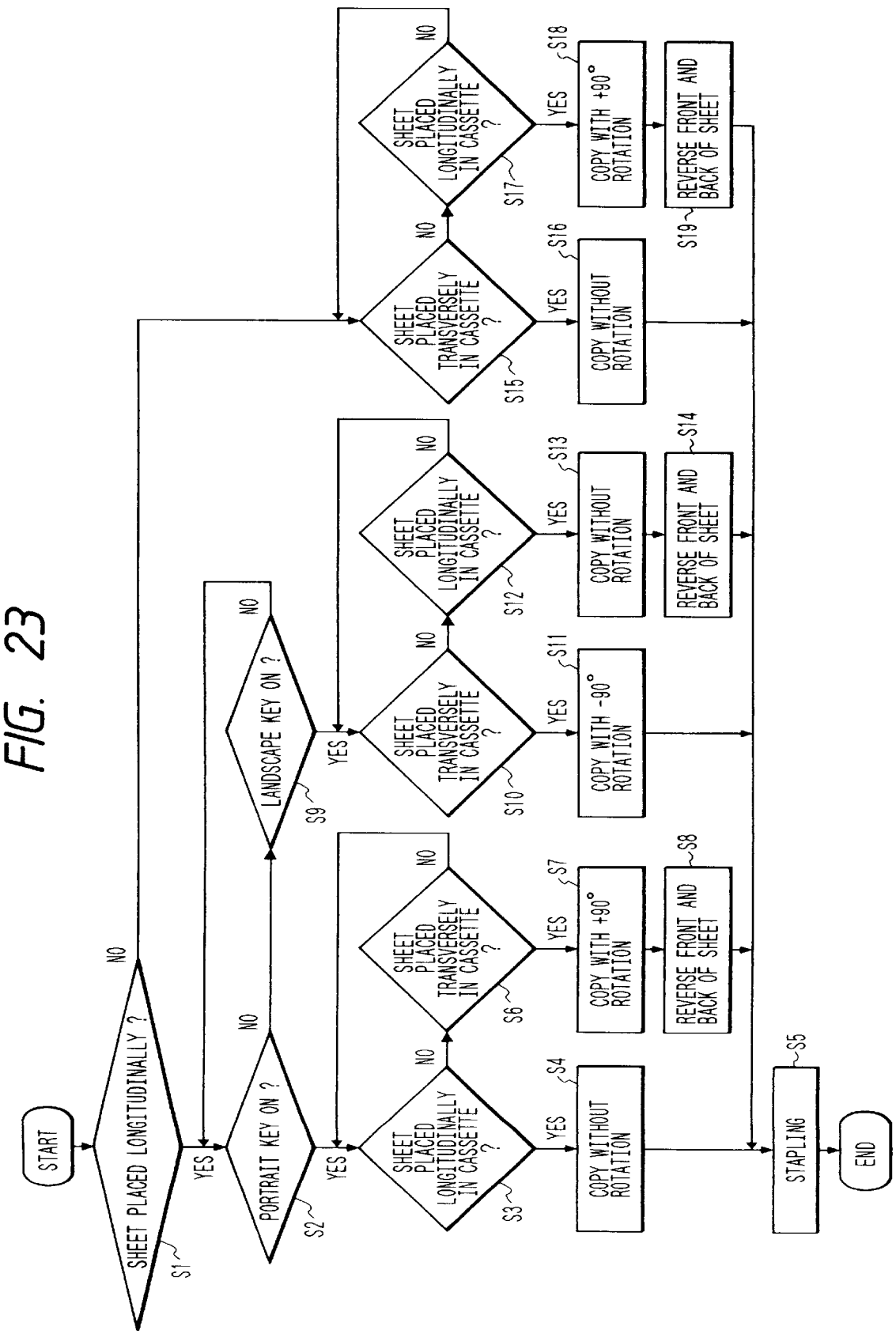
FIG. 23 shows a control flow chart of the copying apparatus.

Referring to FIGS. 20A, 20B to 23, the control automatically staple at the left top position of the copied image in order to facilitate the paging of the copied and stapled sheets is now explained. FIG. 23 shows a control flow chart and FIGS. 20A, 20B to 22 show control states. Document sheets mounted on the document sheet tray 405 of the document sheet feeder 400 are fed to the document sheet table glass 101 in the descending page order, the document sheet is read, the full page of the document sheet is stored on the hard disk 521, and the size and direction of the document sheet are detected by a sensor during the feed of the document sheet to determine whether a side of the document sheet parallel to the feed direction of the document sheet is shorter than a side of the document sheet perpendicular to the feed direction, that is, whether the document sheet is set in the portrait form or not (placed longitudinally or not) (step S1). If the decision in the step S1 is portrait, it is determined whether the portrait key 230 has been depressed or not (step S2). If the decision in the step S2 indicates that the portrait key 230 has been depressed, whether the portrait sheets are loaded in the cassette of the sheet feeders 117 and 118 is determined (step S3). If the decision in the step S3 indicates that the portrait sheets are loaded, the image data is read from the hard disk drive 521 in the descending page order and the document sheet images are copied on the portrait sheets without rotation of the image (step S4), and when all document sheets have been copied, the copy sheets are stapled (step S5). This state is shown in FIG. 20A.

In the step S3, if it is determined that no portrait sheet is loaded, it is determined if landscape sheets are loaded (placed transversely) in the cassette of the sheet feeders 117 and 118 (step S6). In the step S6, if it is determined that the landscape sheets are loaded, the image data is read from the hard disk drive in the ascending page order, the images of the document sheets are rotated by +90° and they are copied on the landscape sheets (step S7) and the sheet front and back sides are inverted (step S8), and the process proceeds to the step S5. This state is shown in FIG. 20B.

If it is determined that there is no landscape sheet loaded in the step S6, the process proceeds to the step S3.

Figure 21A:
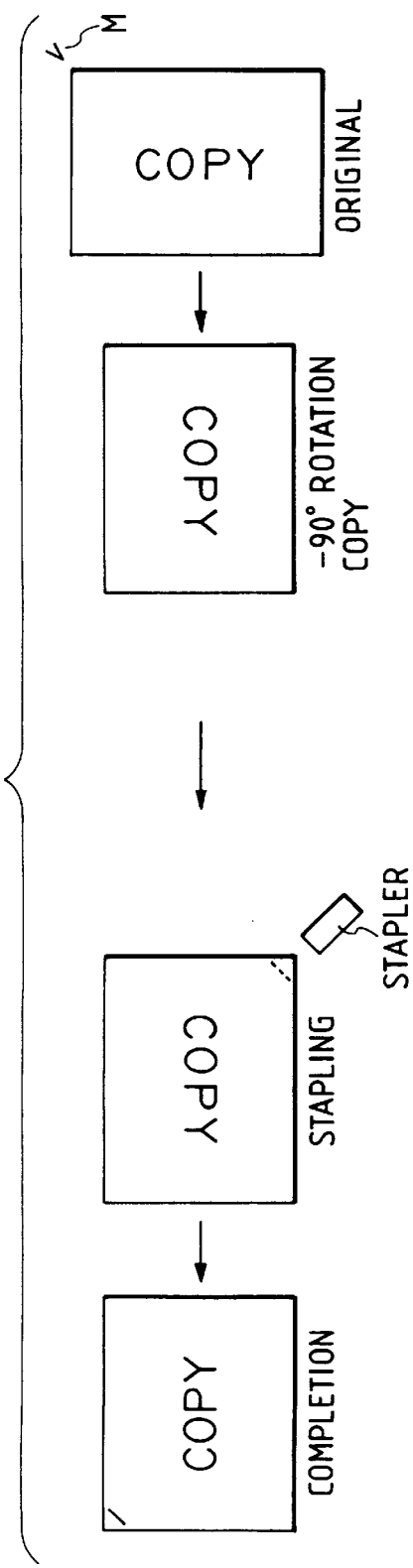
FIGS. 21A and 21B show a control status by the copying apparatus.

If it is determined that the portrait key has not been depressed in the step S2, it is determined whether the landscape key 231 has been depressed or not (step S9). If it is determined in the step S9 that the landscape key has been depressed, whether landscape sheets are loaded in the cassette or not is determined (step S10). If it is determined in the step S10 that the landscape sheets are loaded (placed transversely) in the cassette, the image data is read in the descending page order and the images of the document sheets are rotated by −90° and they are copied on the landscape sheets (step S11), and the process proceeds to the step S5. This state is shown in FIG. 21A.

Figure 21B:
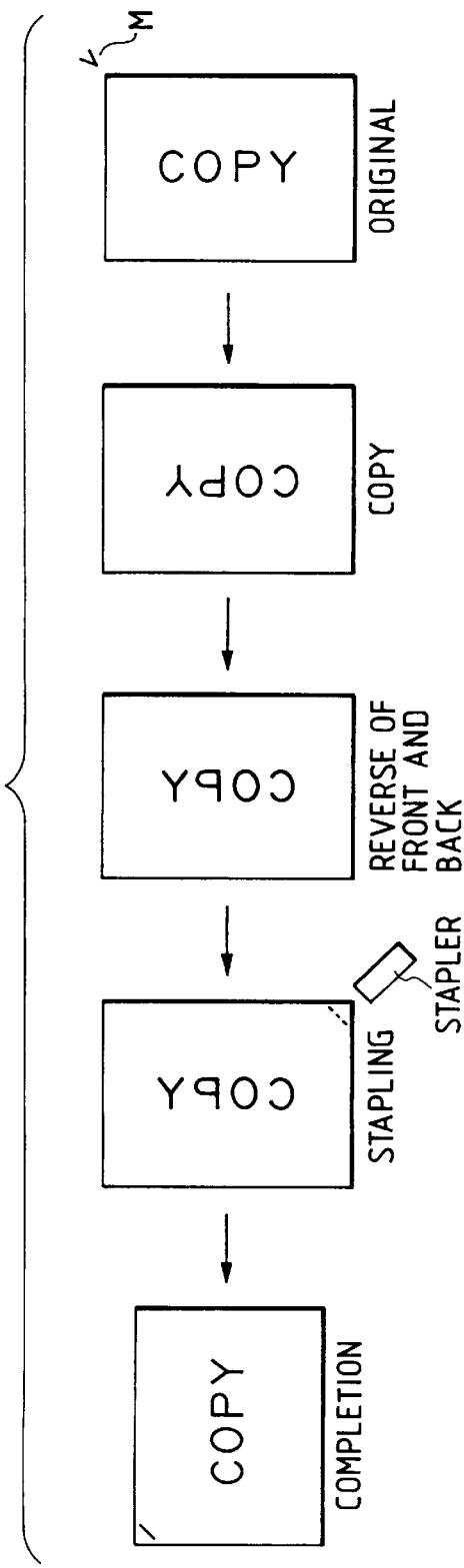

When it is determined in the step S10 that there is no landscape sheet, it is determined whether there is a portrait sheet (placed longitudinally) in the cassette (step S12). If it is determined in the step S12 that there is a portrait sheet, the image data is read in the ascending page order and it is copied on the portrait sheets without rotation of the image (step S13), the front and back sides of the sheets are reversed (step S14), and the process proceeds to the step S5. This state is shown in FIG. 21B. If it is determined in the step S12 that there is no portrait sheet, the process proceeds to the step S10.

When it is determined in the step S1 that the document sheet is not in the portrait position, that is, the document sheet is in the landscape position, it is determined whether the landscape sheets (sheets placed transversely) are in the cassette or not (step S15). If it is determined in the step S15 that there are landscape sheets, the images of the document sheets are copied to the landscape sheets without rotating the images (step S16), and the process proceeds to the step S5. This state is shown in FIG. 22A.

When it is determined in the step S15 that the landscape sheet is not present, it is determined whether the portrait sheets (sheets placed longitudinally) are present or not (step S17). If it is determined in the step S17 that the portrait sheets are present, the image data is read in the ascending page order and it is copied to the portrait sheets with the +90° rotation of the images of the document sheets (step S18), and the front and back sides of the sheets are reversed (step S19) and the process proceeds to the step S5. This state is shown in FIG. 22B.

If it is determined in the step S17 that the portrait sheet is not present, the process proceeds to the step S15.

Where the front and back sides of the sheet are not reversed, the image need not be stored in the hard disk drive 521.

In this manner, the sheets may be bound with the staples at the left top position of the image and the booklet which is easy for practical use is provided.

What is claimed is:

1. An image forming apparatus comprising:
   input means for inputting image information;
   image rotation means for applying rotation to the image information input by said input means;
   image forming means for forming an image on a sheet based on one of image information input from said input means without rotation by said image rotation means and image information rotated by said image rotation means;
   reversing means for reversing a sheet having the image formed thereon by said image forming means;
   stacking means for stacking a sheet which has bypassed said reversing means and the sheet reversed by said reversing means;
   binding means for performing a bind processing with respect to the sheets stacked in said stacking means; and
   control means for controlling said image rotation means and said reversing means so as to conform a binding position for an image when binding processing is performed by said binding means on a sheet that has been reversed by said reversing means, to a position at which image formation is performed without rotation of said rotation means.

2. An image forming apparatus according to claim 1, wherein said image rotation means rotates the image information in units of 90°.

3. An image forming apparatus according to claim 1, wherein said image rotation means has a memory and rotates the image information by address control of said memory.

4. An image forming apparatus according to claim 1, wherein said binder means is a stapler.

5. An image forming apparatus according to claim 4, wherein said stapler staples a corner of the sheet.

6. An image forming apparatus according to claim 4, wherein said stapler flattens legs of a staple upon stapling.

7. An image apparatus according to claim 1, wherein said input means is a scanner for reading an original.

8. An image forming apparatus according to claim 7, wherein said image rotation means performs rotation to match a direction of the original read by said scanner to a direction of the sheet on which the image is formed by said image forming means.

9. An image forming method comprising the steps of:
   inputting image information;
   selectively applying rotation to the image information input by said input step;
   forming an image on a sheet based on one of image information input at said inputting step without rotation by said selectively applying step and the rotated image information;
   reversing a sheet having the image formed thereon at said forming step;
   stacking a sheet which has bypassed said reversing step and the sheet which has been reversed at said reversing stop; and
   controlling the step of image rotation and the step of reversing so as to conform a binding position for an image when binding processing is performed during said binding step on a sheet that has been reversed by said reversing step, to a position at which image formation is performed without rotation.

10. An image forming method according to claim 9, wherein said selectively applying step rotates the image information in units of 90°.

11. An image forming method according to claim 9, wherein said selectively applying step rotates the image information by address control of a memory.

12. An image forming method according to claim 9, wherein said binding step is performed by a stapler.

13. An image forming method according to claim 12, wherein the stapling is of a corner of the sheet.

14. An image forming method according to claim 12, wherein legs of a staple utilized by the stapler are flattened upon stapling.

15. An image forming method according to claim 9, wherein the image information is input by a scanner.

16. An image forming method according to claim 15, wherein the image rotation performed by said selectively applying step matches a direction of an original read by the scanner to a direction of the sheet on which the image is formed.

17. An image forming apparatus comprising:
   input means for inputting image information;
   image rotation means for applying rotation to the image information input by said input means;
   image forming means for forming an image on a sheet based on one of image information input from said input means without rotation by said image rotation means and image information rotated by said image rotation means;
   reversing means for reversing a sheet having the image formed thereon by said image forming means;

stacking means for stacking a sheet which has bypassed said reversing means and the sheet reversed by said reversing means;

binding means for performing binding processing with respect to the sheets stacked in said stacking means; and control means for controlling said image rotation means and said reversing means so as to conform a binding position for an image on a sheet reversed by said reversing means, to a binding position for an image on a sheet which has bypassed said reversing means.

18. An apparatus according to claim 17, wherein said image rotation means rotates the image information in units of 90°.

19. An apparatus according to claim 17, wherein said image rotation means has a memory and rotates the image information by address control of said memory.

20. An apparatus according to claim 17, wherein said binding means is a stapler.

21. An apparatus according to claim 20, wherein said stapler staples a corner of the sheet.

22. An apparatus according to claim 20, wherein said stapler flattens legs of a staple upon stapling.

23. An apparatus according to claim 17, wherein said input means is a scanner for reading an original.

24. An apparatus according to claim 23, wherein said image rotation means performs rotation to match a direction of the original read by said scanner to a direction of the sheet on which the image is formed by said image forming means.

25. An image forming method comprising the steps of:

inputting image information;

applying rotation to the input image information;

forming an image on a sheet based on one of the input image information without rotation and the input image information with rotation;

reversing a sheet having the image formed thereon;

stacking the reversed sheet and a sheet which has bypassed said reversal step;

binding the stacked sheets; and controlling said image rotation means and said sheet reversal so as to conform a binding position for an image on a reversed sheet to a binding position for an image on a sheet which has bypassed said reversal step.

26. A method according to claim 25, wherein said image rotation rotates the image information in units of 90°.

27. A method according to claim 25, wherein said image rotation uses a memory and rotates the image information by address control of said memory.

28. A method according to claim 25, wherein said binding is performed with a stapler.

29. A method according to claim 28, wherein said stapler staples a corner of the sheet.

30. A method according to claim 28, wherein said stapler flattens legs of a staple upon stapling.

31. A method according to claim 25, wherein the image information is input with a scanner for reading an original.

32. A method according to claim 31, wherein said image rotation performs rotation to match a direction of the original read by said scanner to a direction of the sheet on which the image is formed.

* * * * *

UNITED STATES PATENT AND TRADEMARK OFFICE
CERTIFICATE OF CORRECTION

PATENT NO. : 5,913,099

DATED : June 15, 1999

INVENTOR(S) : MASAFUMI KAMEI, ET AL.

It is certified that error appears in the above-identified patent and that said Letters Patent is hereby corrected as shown below:

COVER PAGE AT ITEM [56] U.S. PATENT DOCUMENTS,
Insert: --4,986,520 1/22/91 Shido et al.--.

COLUMN 1,
Line 27, "form" should read --from--; and
Line 33, "hows" should read --shows--.

COLUMN 2,
Line 49, "competes" should read --completes--.

COLUMN 3,
Line 18, "c" should read --a--; and
Line 23, "bent" should read --bend.

COLUMN 9,
Line 54, "bind" should read --binding--.

UNITED STATES PATENT AND TRADEMARK OFFICE
CERTIFICATE OF CORRECTION

PATENT NO. : 5,913,099

DATED : June 15, 1999

INVENTOR(S) : MASAFUMI KAMEI, ET AL.

It is certified that error appears in the above-identified patent and that said Letters Patent is hereby corrected as shown below:

COLUMN 10,
Line 5, "binder" should read --binding--;
Line 10, "image" should read --image forming--; and
Line 29, "stop;" should read --step;--.

Signed and Sealed this

Thirtieth Day of November, 1999

Attest:

Attesting Officer

Q. TODD DICKINSON

Acting Commissioner of Patents and Trademarks